June 30, 1936.    J. E. PADGETT    2,045,612
AUTOMATIC POWER TRANSMITTING MECHANISM
Filed Nov. 21, 1933    4 Sheets-Sheet 4
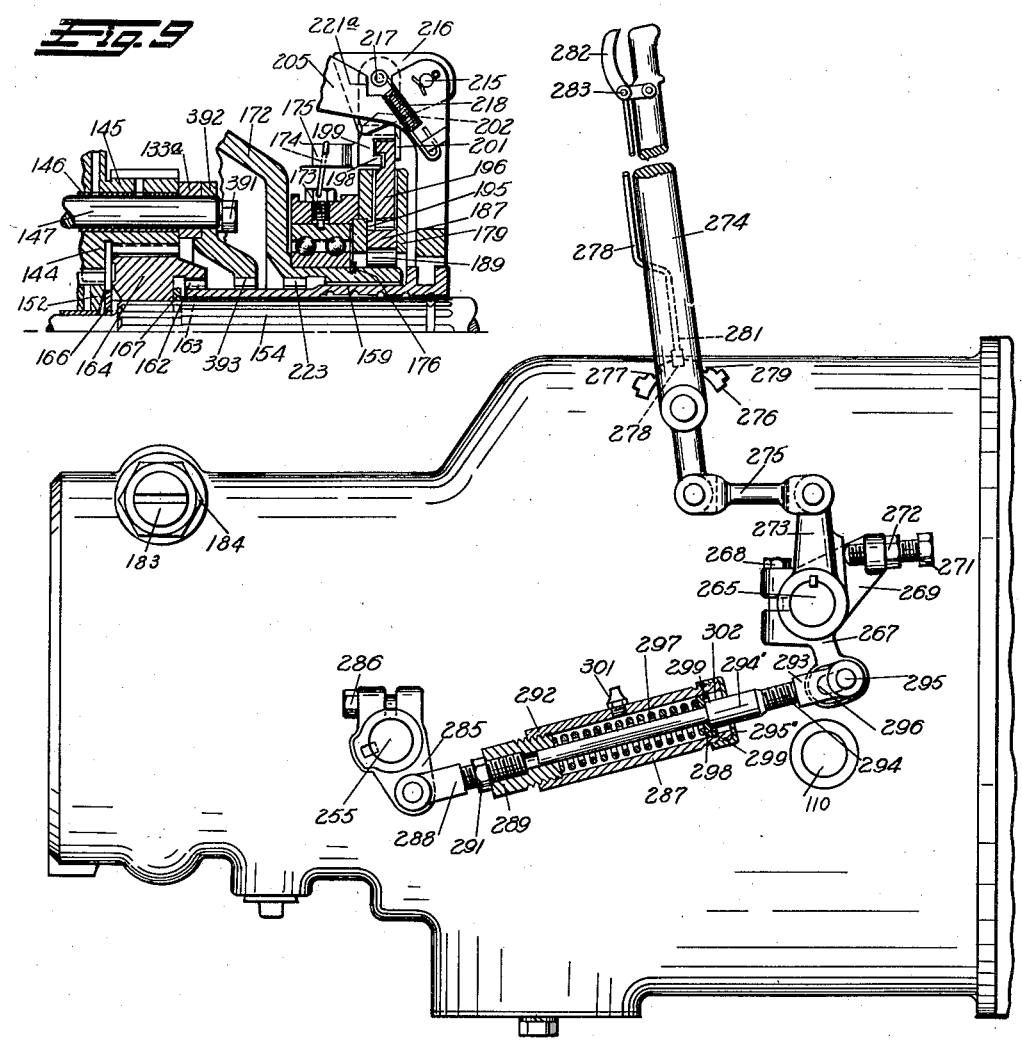
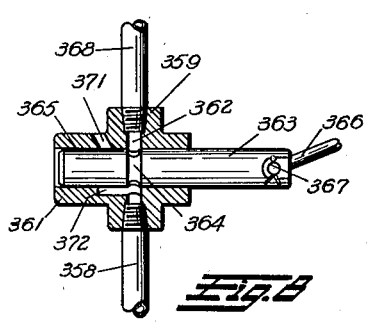
Inventor
Joseph E. Padgett
By Strauch + Hoffman
Attorneys Patented June 30, 1936

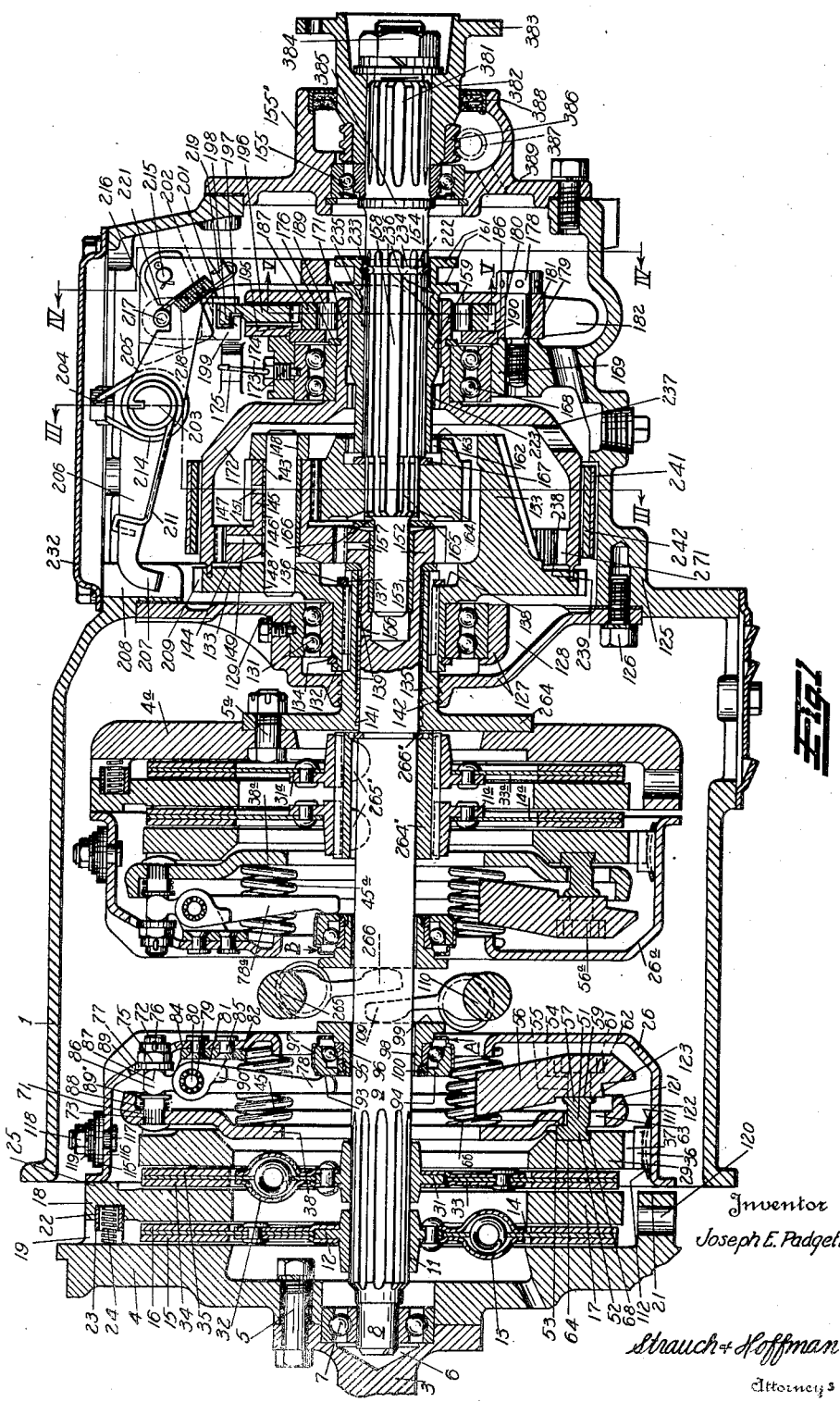

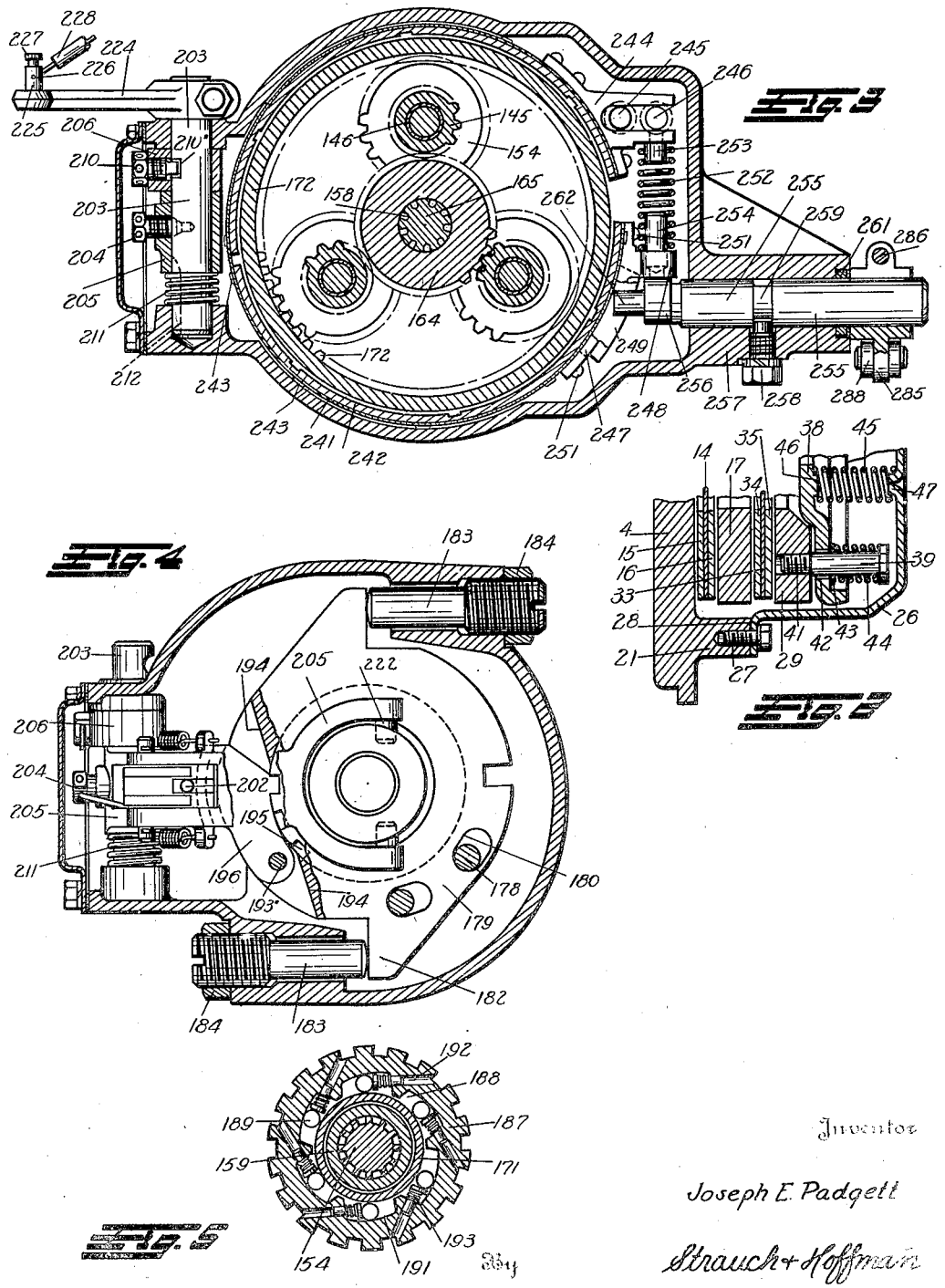

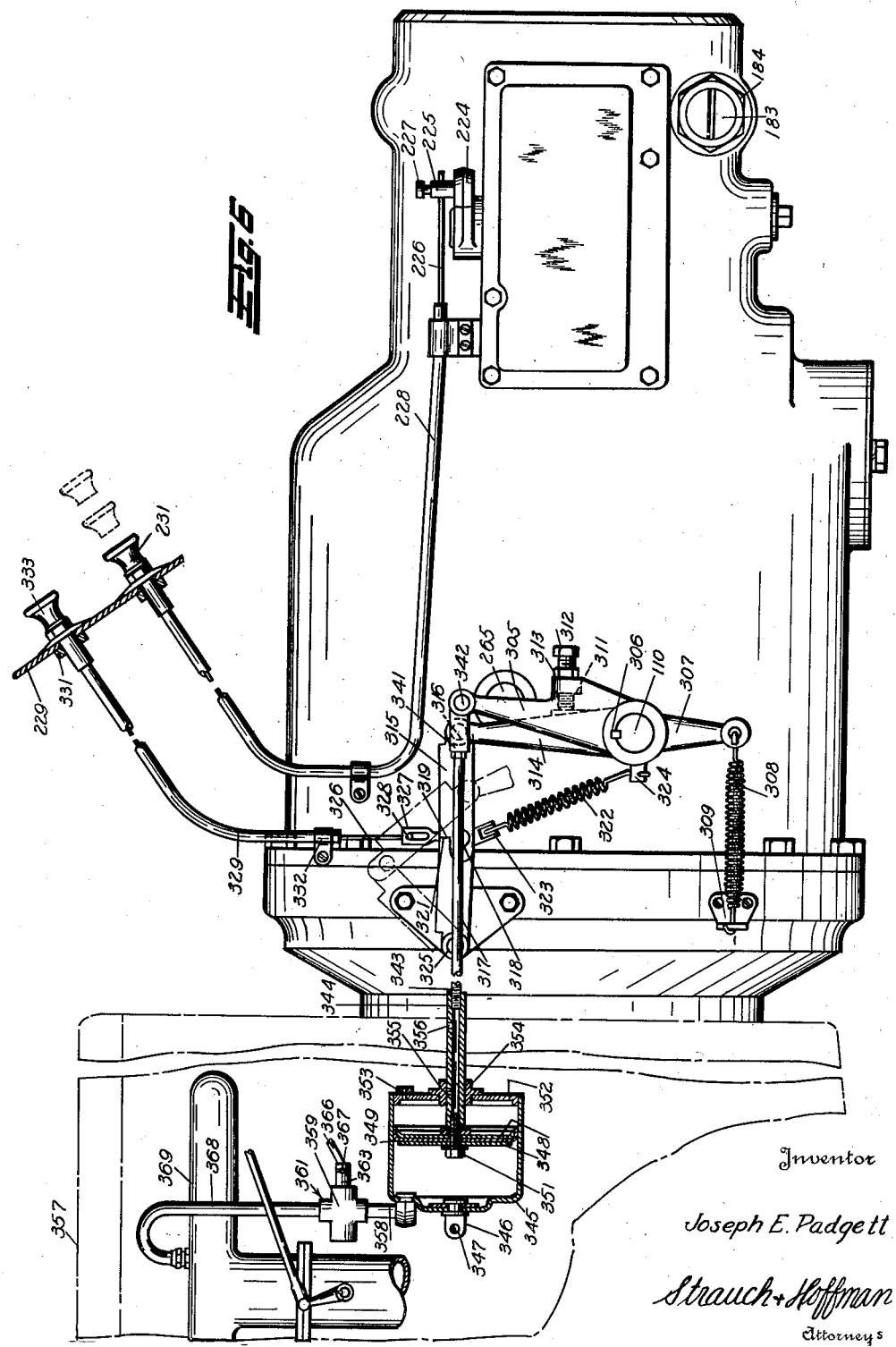

2,045,612

UNITED STATES PATENT OFFICE 2,045,612

AUTOMATIC POWER TRANSMITTING MECHANISM

Joseph Edward Padgett, Toledo, Ohio

Application November 21, 1933, Serial No. 699,078

43 Claims. (Cl. 74—260)

The present invention relates to mechanisms for transmitting power from a driving member to a driven member.

More particularly, the present invention is concerned with automatic mechanisms in which power is delivered from the driving to the driven member with sufficient torque amplification at relatively low driven speeds to pick up the load and to accelerate the driven member until it is rotating at a speed where the prime mover can drive the load with a smaller torque amplification, at which time the load is automatically coupled to the driving member through a lower torque multiplication ratio.

Various automatic power transmitting mechanisms have been heretofore proposed by others, but none of such prior mechanisms have been commercially successful because of the complicated mechanisms utilized, their lack of flexibility and their failure to perform all of the functions necessary for practicability, their high cost of production, their lack of durability and reasonable life, and their sizes and weights when they are constructed to transmit reasonable amounts of power. While development work has been intensively carried forward, and vast expenditures of time and money have been made in efforts to produce automatic transmissions for automotive, industrial and like uses, to meet the essential requirements of low cost, reasonable life, and satisfactory operation, such efforts by others have been so far not met with material commercial success.

A serious disadvantage inherent in prior automatic power transmitting mechanisms resides in the fact that they automatically shift from geared drive to direct drive when the parts are accelerated to a predetermined shifting speed, and they automatically shift from direct drive or high speed into geared speed when the parts are decelerated to a speed which is in the neighborhood of the speed at which they shifted up or effected a transition from geared to direct drives with the result that such mechanisms manifest a tendency to alternately shift into and out of direct drive. That is, they "hunt" when they are operating at speeds in the neighborhood of their shifting speeds. In an apparent attempt to eliminate this highly objectionable operating characteristic, complicated and more or less delicate and costly mechanisms were developed which were so designed as to always require a reversal of drive, as for example is caused in an automotive vehicle by manual closing of the engine throttle, to effect a shift of the transmission parts from one speed to another.

Accordingly, it is a primary object of the present invention to devise compact, flexible and light, but durable, simple, low cost and highly efficient improved automatic power transmitting mechanisms; and it is a further major object of the present invention to so design an automatic power transmitting mechanism that it will not manifest tendencies to "hunt" or alternately shift into and out of a torque multiplying ratio.

The present invention is also concerned with improving certain features of the automatic power transmitting mechanisms shown in co-pending application Serial No. 680,857, filed July 17, 1933, and with devising novel mechanisms for controlling and coordinating the operations of their various parts.

Another important object of my invention is to so design automatic power transmitting mechanisms of the character wherein changes in torque multiplication are automatically effected in response to variations in the speed of the parts, that the parts will shift into one torque multiplying ratio at a speed which is substantially different from that speed where the parts shift out of that ratio.

It is a further object of the present invention to provide an automatic power transmitting mechanism operative to establish a torque multiplying connection between driving and driven members when parts thereof are rotating at a predetermined speed, which will directly couple the driving and driven members when the parts attain a higher predetermined or "shift up" speed; and yet will maintain the direct driving connection thus established when the parts are decelerated to a speed that is very substantially below the "shift up" speed.

Another object of my invention is to provide a transmission mechanism for automatically transmitting power from a driving to a driven member, which will establish a torque multiplying connection between the members when parts of the transmission are rotating at a predetermined speed; will directly couple the members when the parts are accelerated to a higher predetermined "shift up" speed; and will re-establish a torque multiplying connection when the parts are decelerated to a speed near that at which torque multiplication was originally established.

Another object of the present invention is to provide an automatic power transmitting mechanism, of the character wherein changes in torque multiplication are automatically effected in response to speed variations which automatically shift from a higher to a lower torque multiplying ratio when the parts are accelerated to a predetermined speed, and in which the transition from the higher to the lower torque multiplying ratio may be selectively effected when the parts are rotating at speeds less than the predetermined ratio changing speed.

A further object of this invention is to devise, for use in transmissions of the character having mechanism for automatically changing the torque multiplication thereof when the parts are accelerated and attain a predetermined speed, means for changing the torque multiplication when the parts are operating at speeds less than the predetermined speed.

Another object of my invention is the provision of power transmitting mechanisms having a device for automatically shifting from a torque multiplying to a direct drive condition when parts thereof are accelerated to a predetermined speed, with means adapted to be automatically actuated by a reversal of driving effort in the mechanism, for automatically effecting a transition from torque multiplying to direct drive when the parts of the mechanism are operating below the predetermined speed.

It is a still further object of the present invention to devise a novel power transmitting mechanism which will normally maintain a torque multiplying connection between driving and driven members when parts thereof are operating at relatively low speeds; will automatically establish a direct drive between the driving and driven members when the parts attain a predetermined speed; will re-establish a torque multiplying drive when the parts are decelerated to a predetermined speed that is substantially less than the first predetermined speed; and yet will automatically re-establish a torque multiplying drive when the parts are operating at speeds intermediate said predetermined speeds and the torque demanded by the load exceeds a predetermined value.

Another object of this invention is to provide automatic transmissions of the character having a back stop for taking the reactive forces set up by certain parts thereof when they are delivering power through a torque multiplying drive, with means, associated with certain other parts of the mechanism, for causing them to establish a direct power transmitting connection when the direction of drive is momentarily reversed.

Another object of this invention is to devise an automatic transmission that will automatically shift from a low to a high speed ratio when the parts are accelerated to a predetermined speed, and which may be selectively operated to maintain the high speed ratio, even when the parts are rotating below the predetermined shift speed.

A further object of my invention aims to devise, for use in automatic transmissions of the character having a primary, or a low speed clutch for initiating drive through a torque multiplying connection, and a secondary or high speed clutch for establishing a direct drive when the load, under the influence of the torque multiplying connection has been accelerated to a speed where the prime mover utilized with the mechanism can adequately handle the load with a direct drive, a primary clutch organization responsive to the speed of the driving shaft and also responsive to the power supplied to the driving shaft.

Another object is to provide power delivering organizations of the type wherein an automatic transmission is adapted to receive power from a prime mover, with means for automatically establishing a power transmitting connection through the automatic transmission when the prime mover is stopped.

It is a further object of my invention to so design automatic transmissions of the character wherein changes in torque multiplication are automatically effected in response to variations in the speed of the parts, that the parts will shift into one torque multiplying ratio at a speed which is substantially different from that speed where the parts shift out of that ratio, and which may be operated to automatically shift into and out of a particular torque multiplying ratio at speeds which are of substantially equal magnitude.

Another object of this invention resides in the provision of power transmitting mechanisms having a device for automatically shifting from a torque multiplying to a direct drive condition when parts thereof are accelerated to a predetermined speed, with means, adapted to be actuated by a reversal of driving efforts in the mechanism, for automatically effecting a transition from torque multiplying to direct drive when the parts of the mechanism are rotating below the predetermined speed, and which may be rendered inoperative to establish such transition in response to reversal of driving efforts.

It is another object of this invention to devise, for use in power transmitting mechanisms of the character wherein driving and driven members are intercoupled with a planetary gear organization, means for shifting certain parts of the planetary organization to provide at least two different torque multiplying ratios.

My invention further aims to provide a power transmitting mechanism having a planetary gear assembly adapted to connect driving and driven members, with means for selectively coupling different parts of the planetary assembly to one of the members.

A still further object of this invention resides in the provision of power delivery organizations of the type wherein an automatic transmission is driven by a prime mover and is adapted to establish a power transmitting drive in accordance with operations thereof, with selectively operable power actuated means for disconnecting the transmission from the prime mover.

It is another object of this invention to devise, for use in automatic transmissions, a novel gear organization which is so related to the transmission parts that it may be utilized to provide reverse as well as a forward drive, the torque multiplying ratio for reverse drive being different than that for forward drive.

Further objects of this invention will become apparent as the description thereof proceeds in connection with the annexed drawings, and from the appended claims.

In the drawings,

Figure 1 is a longitudinal sectional view of the power transmitting mechanism of the present invention, and the latch and associated structure located in the gear chamber is illustrated as having been rotated through 90° in a counter-clockwise direction, when viewed from the left-hand side of the figure, in order to more clearly show the structure employed.

Figure 2 is a fragmental sectional view of the primary clutch shown in Figure 1, and it particularly shows the driving and holdback spring assemblies.

Figure 3 is a sectional view taken substantially on the line III—III of Figure 1, illustrating the parts as they appear when viewed in the direction of the arrows.

Figure 4 is a sectional view taken substantially on line IV—IV of Figure 1, looking in the direction of the arrows.

Figure 5 is a sectional view taken substantially on the line V—V of Figure 1 as viewed in the direction of the arrows.

Figure 6 is an elevational view of the mechanism shown in Figure 1, and it illustrates the mechanism which is preferably employed for controlling the primary clutch and the shifting assembly.

Figure 7 is an elevational view of the opposite side of the device shown in Figure 6, and it illustrates the mechanism which is preferably employed to control the secondary clutch and the internal gear brake.

Figure 8 is a detailed sectional view of the valve illustrated in Figure 6.

Figure 9 is a fragmental longitudinal view of a modified form of my invention.

With continued reference to the drawings wherein like reference characters designate like parts throughout the several views thereof, my novel power transmitting mechanism is enclosed in a housing denoted generally at 1.

The mechanism, when broadly considered, consists of a low speed, or primary clutch which is adapted to initiate the drive through a torque multiplying mechanism, and a high speed or secondary clutch which is adapted to establish a direct drive between the prime mover and the load when the latter has been accelerated to a predetermined speed. The description of the various parts will accordingly be divided into separate parts, so as to facilitate understanding the various phases of the invention. The primary clutch will be considered first.

Primary clutch

A driving shaft 3 is adapted to have rotational efforts applied to it by a suitable prime mover in any desired manner, and in the present instance, it is shown as constituting the crank shaft of an internal combustion engine. The flanged end of shaft 3 is secured to a flywheel 4 by bolts 5, or in any other suitable manner. Bolts 5 extend through aligned apertures in the flywheel and the flange of shaft 3, and have nuts turned thereon.

Shaft 3 is further provided with a bore 6 in which is carried a bearing assembly 7 for supporting the reduced end 8 of a shaft 9. The rear end of shaft 9 is adapted to be journalled in a bearing assembly that will be described hereinafter.

A hub 11 is splined upon shaft 9 and is provided with a flange 12. Operatively secured to flange 12, by means of rivets or the like, is a vibration dampener designated generally by reference character 13 which provides a resilient driving connection between hub 11 and a driven disc 14. This vibration dampener is employed to dampen out any torsional vibrations that may be set up in the crank shaft of the engine, and in view of the fact that it forms no part of the present invention, it will not be further described.

Facings 15 and 16 are secured to opposite sides of disc 14 near its periphery, and they may consist of any material that has the required characteristics to give the correct frictional gripping force, and at the same time has wearing qualities adapting it for this purpose. I prefer, however, to use the types of material which in practice have given very satisfactory results in automatic slipping drive and clutch mechanisms of the "Powerflo" type. One form of material, embodying colloidally associated copper particles and powdered graphite, is disclosed in co-pending application Serial No. 685,603 filed August 17, 1933, and which is particularly suitable for use in the present mechanism. Frictional facings 15 and 16 may be secured to disc 14 in any suitable manner, as for instance by rivets or the like, and they, along with disc 14, will be hereinafter referred to as a driven member. Facings 15 and 16 may be annular discs, but they are preferably formed as segments and secured to disc 14 in circularly spaced relation, in order to provide a flow of cooling air currents over the faces of their cooperating plates, in a manner that will presently be set forth.

Facing 15, secured to disk 14, cooperates with the flat driving face of flywheel 4 and is adapted to be frictionally driven thereby. Facing 16, cooperates with a plate 17, which will be hereinafter termed the intermediate plate, and it is adapted to engage and clamp the driven member between it and the flat face of the flywheel. Plate 17 is of substantial thickness so that it may possess a sufficient degree of rigidity to prevent undesirable distortion and warpage thereof under the pressures and temperatures that it is subjected to during operation of the mechanism.

Intermediate plate 17 is driven by the flywheel through the intermediary of driving lugs 18, which are preferably three in number and are integrally formed with plate 17. Lugs 18 are disposed in sliding engagement with the walls of recesses 19 which are formed in rim portion 21 of flywheel 4. Each lug 18 is provided with a recess 22 into which is frictionally fitted a sleeve 23. Comparatively light compression springs 24 are disposed in sleeves 23 and act against the flywheel so as to force plate 17 away therefrom. Although I prefer to associate springs 24 with lugs 18, it is to be understood that they may be located so as to act against any other suitable portion of plate 17 without departing from the spirit of the present invention.

Movement of plate 17 away from the flywheel is limited by engagement of boss portions 25, formed on lugs 18 thereof, with a cover member 26.

Cover member 26 is secured to the flywheel rim portion 21 by means of cap screws 27, and it is provided with embossed portions 28 in the regions of cap screws 27, for the purpose of spacing the cover from the flywheel rim for a purpose that will presently appear.

Cooperating with plate 17, and with an automatic plate 29, is a second driven member, comprising a hub 31; a vibration dampener 32 and a driven disc 33, carrying facings 34 and 35. Secured to the inner walls of cover 26, by means of a spot welding operation or the like, are preferably three symmetrically arranged driving lugs or key members 36. Key members 36 are received in, and cooperate with the walls of recesses 37 formed in automatic plate 29 to establish a driving connection between flywheel 4 and the automatic plate.

Disposed parallel to plate 29 is a plate 38, and it will be hereinafter referred to as a reaction plate, because it takes the reaction of a speed responsive mechanism in a manner to be presently described. Reaction plate 38 is driven by automatic plate 29 through the medium of a plurality of cap screws 39. Referring particularly to Figure 2, each cap screw 39 is provided with a reduced end 41 that is threaded into automatic plate 29, and the thread employed is preferably of the Dardelet or other self-locking type so as to prevent the cap screws from working loose in operation. Cap screws 39 extend through, and lie in slidable driving engagement with the walls of recesses 42 formed in reaction plate 38, and are encircled by washers 43 and compression springs 44. Springs 44 act against the heads of screws 39 and react against plate 38, to thereby urge the automatic and reaction plates toward each other at all times, and they will be hereinafter referred to as holdback springs. The holdback spring assemblies are preferably symmetrically disposed in pairs about the periphery of the plates, and in the present instance six are employed, but it is to be understood that more or less than six properly designed holdback spring assemblies may be used if desired without in any way departing from the spirit of my invention. The holdback assemblies accordingly establish a driving connection between the automatic and reaction plates, and, at the same time resiliently urge them toward each other.

Reaction plate 38 is normally urged toward the flywheel by a plurality of compression springs 45, which are retained in position against plate 38 by means of bosses 46 formed on the latter. Springs 45 react against the surface of cover 26, and are centered thereon by means of pressed out portions 47 formed in cover 26. Springs 45 are preferably six in number and are disposed in substantially common radii with the holdback assemblies. Reaction plate 38, however, is normally held in the position shown in Figure 1, when the driving shaft is operating at or below the idling speed of the engine or other prime mover, by means of a throwout mechanism that will presently be described.

Before proceeding to the description of the actuating mechanism for the automatic plate, it should be understood, that although I have illustrated the surfaces that engage facings 15 and 16 as plane in configuration, they may be grooved in the manner shown in my copending application Serial No. 669,766, if desired.

The automatic and reaction plates may be actuated away from each other by any suitable speed-responsive mechanism, to produce clutch engagement, but in the present embodiment of my invention, it preferably takes the form of a centrifugally operable mechanism. Preferably three weight levers 51, having integrally formed heads 52, are symmetrically arranged between the pairs of pressure springs 45, and have their heads 52 received in rectangular recesses 53 formed in automatic plate 29.

Each lever 51 is provided with a pair of threaded portions 54, which are received in a pair of apertures 55 located in a weight element 56. A reinforcing portion 57 is preferably formed on each lever 51, and is provided with a flat surface 59 that is adapted to abut the surface of weight 56. Weights 56 are held in place on levers 51 by means of nuts 61, turned on portions 54, and seating in countersinks 62 formed in weights 56.

Levers 51 are of substantial width and extend through recesses 63 formed in reaction plate 38. Heads 52 are provided with flat faces 64 that normally abut the bottoms of recesses 53 when the driving shaft is operating at, or below idling speed, and by the term "idling speed", I mean the particular desired automatic uncoupling or disengaging speed of shaft 9, and if an internal combustion engine is employed as the prime mover, the idling speed will lie in the neighborhood of four hundred to five hundred revolutions per minute.

Heads 52 are also provided with reaction faces 66 which abut the face of reaction plate 38 at all times, and are designed for fulcruming engagement therewith during operation of the weights. The surface of plate 38 that cooperates with faces 66 of weight-heads 52 may, if desired, be ground and polished so that relative sliding movement thereof may occur with a minimum of friction.

Heads 52 have their outer sides relieved to provide knife-like edges 68 which are adapted to rock or pivot in the dihedral angles defined by the bottom and outer faces of recesses 53 formed in automatic plate 29. The relieving operation enables a good knife edge 68 to be formed on each weight head, and allows pivotal movement thereof without interference from the outer side walls of recesses 53. However, it is to be understood that unrelieved weights may be employed in recesses that are suitably designed so as to have relieved outer side walls, if desired. It is also to be understood that, instead of providing individual recesses 53 for cooperation with the weight heads, a single annular groove, as shown in my copending application Serial No. 660,179, filed March 9th, 1933, may be formed in automatic plate 29 if desired.

Recesses 53 are formed in automatic plate 29 in any desired manner, as for instance by a milling cutter or the like, and weight heads 52 are prevented from moving longitudinally within the recesses so formed, by the engagement of the walls of recesses 63 formed in plate 38, with the sides of levers 51. Heads 52 fit rather snugly between the inner and outer side walls of recesses 53 so that they are restrained from shifting bodily inwardly or outwardly, thereby insuring dynamic balance of the mechanism at all times. Knife edges 68 are adapted to cooperate with the flat bottom faces of recesses 53 and thereby act in line contact upon plate 29 for a substantial distance across the face thereof, whereby uniform distribution of pressure over a substantial area thereof is effected.

The mass of weights 56, and the number of weights and lever assemblies employed in a particular installation is determined by a consideration of the required pressure that they must transmit under the desired speed conditions to urge the clutch plates into final non-slipping engagement. In the clutch mechanism shown, three equally spaced weight assemblies are preferably employed.

When shaft 3 is stationary, or is operating at or below a speed corresponding substantially to the idling speed of the prime mover employed to drive it, the parts assume the positions in which they are shown in Figure 1. Heads 52 of levers 51 are clamped between plates 29 and 38, under the influence of springs 45 acting against plate 38, and cap screws 39, and plate 38 is held in the position shown, against the action of springs 45 by means of a throwout mechanism that will be described hereinafter.

Extending through apertures 71 formed in plate 38, and preferably symmetrically disposed between the weight assemblies, are a plurality of bolts 72. Bolts 72 are provided with knurled portions 73, and as bolts 72 are driven into plate 38, they serve to hold bolts 72 against rotation. Castle nuts 75 are threaded on bolts 72 and are adapted to be held in adjusted positions thereon by means of cotter pins 76. Washers 77 are disposed on bolts 72 and cooperate with clutch fingers 78 to produce movement of plate 38 away from the flywheel. Fingers 78 are pivoted on roller or needle bearings 79 journalled on pins 80 secured in spaced ears 81 formed on bracket members 82. Pins 80 are preferably held in position in ears 81 by means of cotter pins or the like, and brackets 82 are secured against pressed in portions 84 of cover 26 by means of rivets 85 or the like. Fingers 78 are provided with bifurcated portions 86, and the latter have curved faces 87, that cooperate with washers 77 in a manner to be presently described. Bolts 72 are also encircled by light compression springs 88 and washers 89' and the latter are urged into contact with levers 78 to hold the latter against rattling when they are not under the influence of springs 45.

Bolts 72 and nuts 75 are adapted to partially extend through apertures 89 formed in cover 26, and the apertures are preferably of a size sufficient to allow a wrench or the like to be applied to nuts 75 for clutch adjustment purposes.

Levers 78 are provided with weight or mass portions 90, which function to balance the levers and prevent them from responding to centrifugal force and tend to impart declutching movements to the clutch parts.

Movement of the inner ends of fingers 78 to the left in Figure 1, through the intermediary of bolts 72, causes movement of plate 38 away from the flywheel against the action of springs 45. Movement of the reaction plate produces similar movement of plate 29 because the holdback assemblies hold the two plates in unitary relationship at all times. Fingers 78 are adapted to be actuated in this manner by means of a throwout assembly that will now be described.

Cooperating with curved faces 93 formed on fingers 78 is the flat face of a ball race 94, which cooperates with antifriction balls 95 disposed between race 94 and a cooperating ball race 96. Ball races 94 and 96 are held in assembled relation with respect to each other by means of a combined retainer and reservoir defining member 97. The bearing assembly is preferably packed with lubricant during assembly. Ball race 96 is rigidly mounted upon a sleeve 98 which is mounted for rotative as well as axial movement on shaft 9.

The bearing assembly just described will be hereinafter referred to as bearing or throwout assembly A, and a sealing member 100 is secured to sleeve 98 and frictionally cooperates with ball race 94 so as to retain the lubricant in the bearing. Sleeve 98 is provided with a smooth throwout fork engaging face 99, which cooperates with throwout fingers 109 rigidly carried by a throwout shaft 110. Shaft 110 is preferably journalled in, and extends outwardly of clutch housing 1, and is adapted to be actuated by mechanism to be hereinafter described.

Although I have disclosed a specific throwout assembly in connection with my invention, it is to be understood that any suitable throwout mechanism having a face that is substantially normal to the clutch axis for cooperating with the inner ends of fingers 78 may be employed if desired, and a thoroughly practical mechanism obtained.

With reference to the automatic and reaction plates, it is observed that they are "keyed" together, or connected together for synchronous rotation by means of the holdback assemblies, and reaction plate 38 is in fact carried by automatic plate 29. Weights 56 are also carried by the automatic plate, and as this weight and plate organization is of comparatively great mass, movement thereof radially, or in any direction other than parallel to the axis of the mechanism, results in static as well as dynamic unbalance thereof, and as a matter of fact, it has been found in practice that for the clutch mechanism illustrated, a radial or sidewise movement of four one-thousandths of an inch of these elements represents approximately two inch-ounces tending to unbalance the mechanism.

In order for the plate and weight assembly to function properly, it must be capable of undergoing free axial movement. By designing driving lugs 36 and recesses 37 so as to provide sufficient play to permit this action, sufficient lost motion is usually introduced into the plate organization to permit it to undergo a slight radial movement, and this results in the unbalanced condition just described.

In order to eliminate this difficulty, the plate and weight organization is so designed, that it is in substantial or complete static and dynamic balance when the automatic plate is located on one side of the mechanism, i. e., with the walls of recesses 37 in close contact with two of the driving lugs 36, and means consisting of a bowed leaf spring 111, having an aperture 112, which fits over and is held in place by one of the driving lugs 36, is provided for maintaining the assembly in this condition during all phases of operation of the mechanism, with the result that it is balanced at all times. In view of the simple design of the present clutch mechanism, the parts thereof may be manufactured by low-cost, quantity production methods, and yet provide plate and weight organizations whose mass is fairly symmetrically distributed. Spring 111 acts against and applies pressure to the portions 3 of plate 29, that are located either side of recess 37.

In view of the fact that spring 111 exerts a frictional resistance against only one side of plate 29, engaging and disengaging movements of the latter axially of the mechanism are yieldingly resisted or retarded to some extent, which may result in the automatic plate tilting slightly as it undergoes movement into and out of engagement with facing 35. This is an advantage rather than a disadvantage, however, because the slight tilting action which takes place is not sufficient to unbalance the mechanism, especially at the comparatively low speed at which engagement occurs, and the resulting initial partial and progressive engagement of automatic plate 29 with facing 35, as weights 6 rock outwardly, imparts extremely smooth operating characteristics to the mechanism and produces a "cushion disc" action. When the clutch is fully engaged, the plates are not tilted, but are disposed parallel to each other and normal to the axis of the mechanism, so that the mechanism does not vibrate, even at high speeds. Spring 111 accordingly maintains the parts in balance condition at all times, and yet, in view of its resilient nature, it does not interfere with free axial and slight tilting movements of automatic plate 29.

In order to provide dynamic and static balance of the mechanism as a whole, I provide balance assemblies which are preferably secured to the outer cylinderical portion of cover 26, and they are preferably symmetrically located between the weight assemblies or radially outwardly beyond levers 78. Each balance assembly preferably consists of a pair of main or principal weight members 115, which take the form of washers; and a plurality of auxiliary weight members 116 which consist of small washers in the present embodiment of the invention; which are held in place by means of a bolt 117, passing through an aperture in cover 26, a nut 118 and a lock washer 119.

The mass of the balance assemblies depends upon the nature of the particular clutch mechanism and the dimensions and mass of the parts thereof. In the particular clutch illustrated, three symmetrically arranged balance assemblies of the size shown are employed and their mass is such as to offset the concentrated mass represented by the weight assemblies and render the mechanism both statically and dynamically balanced. In the event that after the balance assemblies are applied to the mechanism, the latter is still out of either static or dynamic balance or both, because of unsymmetrical mass distribution caused by manufacture of the parts by low-cost, quantity production methods, one or more washers 119 may be removed from or added to one or more of the balance assemblies to bring about proper balance of the mechanism.

The provision of the present balance mechanism materially reduces the cost of producing clutch mechanisms of the manual or automatic type because their parts may be cheaply made without regard to their mass or dimensions, and if, upon assembling the mechanism, it is found that it is out of balance, either statically or dynamically, it can be readily brought into balance in the manner just described.

Shaft 110 is preferably adjustably held by any suitable mechanism in such a position that the throwout bearing assembly will hold the parts in the positions in which they are shown in Figure 1 when driving shaft 3 is stationary or is operating at or below a predetermined idling speed of the prime mover utilized therewith when it is desired to obtain speed responsive clutch operation. Under these conditions, a clearance exists between the plates and there is accordingly no driving connection between shafts 3 and 9. Any suitable latch mechanism may be associated with shaft 110 or the clutch pedal for holding shaft 110 in this position, for instance a latch of the type disclosed in my copending application, Serial No. 660,179, filed March 9, 1933, and which may be referred to for a full disclosure thereof, but I preferably employ a power operated device which will be hereinafter described. The throwout bearing assembly is shown in Figure 1 in what is termed its "automatic" position, and is so termed because it is preferably disposed in this position when the clutch mechanism functions, or is being employed as an automatic or speed responsive clutch.

Shaft 110 may be actuated to move the throwout bearing assembly to the left of the position shown in Figure 1, for declutching the mechanism in a manner to be hereinafter pointed out.

The throwout shaft also may be operated to allow the throwout bearing to move to the right of the position illustrated in Figure 1, into what is termed its manually engaged position, and allow springs 45 to bring the plates into driving engagement.

With throwout mechanism A disposed in automatic position, the speed responsive operation of the primary clutch is as follows:

*Automatic operation of primary clutch*

Acceleration of shaft 3 slightly above the idling speed of the prime mover does not cause actuation of the weights because springs 44 hold them in check. As driving shaft 3, and flywheel 4 are accelerated to a speed substantially in excess of idling speed, which is determined by the strength of springs 44, the mass of weights 56, the proportions of the parts, and other factors, weights 56 gradually swing or rock outwardly about their knife-edges 68 as axes in response to centrifugal force. As this occurs, reaction faces 66 of heads 52 fulcrum and slide on the face of plate 38, and knife edges 68, by virtue of their engagement and fulcruming action upon the flat bottom surfaces of recesses 53 located in automatic plate 29, force the automatic plate away from reaction plate 38 against the action of holdback springs 44, and into engagement with facing 35 of disc 33, on a three-point support, thus causing disc 33 to move axially and bring the facing 34 thereof into contact with intermediate plate 17, which is then moved axially against the action of retractor springs 24, and clamps driven member 14 between it and the flywheel.

Movement of automatic plate 29 away from reaction member 38 is opposed by holdback springs 44, and therefore weights 56 are held under control. Holdback springs 44, therefore, in addition to predetermining the speed of the mechanism at which automatic engaging operation is initiated, exert a steadying influence upon the clutch parts.

After the driven members are thus frictionally clamped or gripped between automatic plate 29, the intermediate plate 17 and flywheel 4, movement of plate 29 is substantially arrested, and further rocking movement of weights 56, in response to a further increase in centrifugal force, causes faces 66 of heads 52 to force reaction plate 38 away from the flywheel against the action of springs 45. Movement of plate 38 in this manner causes pressure to slowly build up in springs 45, and a corresponding pressure is built up between the edges 68 of heads 52, and the bottoms of the recesses in automatic plate 29. This action causes the plate pressure to build up comparatively slowly, with the result that the clutch smoothly picks up shaft 9.

The partial vacuum established by rotation of the parts causes an air stream to be drawn through the relatively large annular passage between cover 26 and the throwout bearing and along the clutch axis. A part of the axial air stream passes over both faces of plate 38 and between plates 38 and 29, and in this connection it should be observed that plates 29 and 38 are substantially thermally isolated, and the air currents passing between them effectively prevent the heat that is generated in plate 29, as the result of its slipping operation, from being transmitted to plate 38, and possibly drawing or harmfully modifying the temper of springs 44 and 45 associated with the latter. Another portion of the air stream passes outwardly between plate 29 and facing 35 when they are disengaged, and the heated, dust-laden air is exhausted from the mechanism through the space between the flywheel and cover 26. If desired, additional openings may be formed in the cylindrical portion of cover 26 for assisting in exhausting the heated dust-laden air from the mechanism, and fan blades or the like associated therewith for drawing the air through the openings. Portions of the axially moving air stream enter openings formed in discs 14 and 33 (not shown), and are discharged radially between the driven members and the intermediate plate and flywheel, and are exhausted from the cover through openings 120 formed in flywheel rim 21, and between cover 26 and the flywheel.

The ventilating and dust-removing air may be introduced into, and exhausted from housing 1 in any desired manner, but I preferably contemplate the use of the organizations disclosed in application Serial No. 606,238, filed April 19, 1932, which have proved to be extremely efficient in practice.

When shaft 3 and flywheel 4 attain a predetermined speed the plate pressure builds up sufficiently to establish a non-slipping drive between shafts 3 and 9. This speed is determined by the magnitude of the torque transmitted by the clutch, as under heavy loads, the speed will be higher than that required to establish a non-slipping drive when the load is light. When a still higher predetermined speed is attained, weights 56 rock out into contact with arcuately shaped stop faces 121 formed on pressed flange portions 122 of plate 38, and are thereby arrested. In order to stop weights 56 in a definite plane that is normal to the mechanism, and thus insure dynamic balance of the device, preferably arcuately shaped stop edges or faces 123 are accurately formed on weights 56. The stops are also designed to stop weights 56 with their centers of mass equidistant from the axis of the mechanism. When the weights have moved into their outermost positions with their stop faces 123 in contact with stop faces 121, the plates are disposed in non-slipping engagement and further acceleration of shaft 3 is ineffective to cause a further pressure to be built up between the plates. The plates are thereby held in non-slipping engagement under a predetermined pressure, and a positive friction coupling exists between shafts 3 and 9.

Stop faces 123 are so located on weights 56, that no matter how great the magnitude of the centrifugal force set up in weights 56 may be, it is incapable of causing the mechanism to exhibit declutching tendencies at high speeds.

With reference to levers 78, they are designed so that, when the clutch is engaged, the masses thereof are so located with respect to their pivots, that the centrifugal forces set up therein, as the result of rotation of the mechanism, do not exert substantial rotative influences in the levers. When the parts are disposed in automatic idling position (Fig. 1), the greater portion of the masses of levers 78 is located to the right of their pivots, but this is not a disadvantage, however, because the parts only assume these positions when the mechanism is rotating at low speeds, and the centrifugal forces existing under these conditions are likewise of low magnitude.

Torque multiplying and related mechanisms

Secured to boss portion 125, formed on housing 1, in any suitable known manner, as by means of cap screws 126 or the like, is a partition-forming bearing support 127, having a lubricant return passage 128 formed therein. Secured within portion 127 against axial displacement by means of a set screw 129, is the outer race of a bearing assembly 131. The inner race of bearing assembly 131 supports the sleeve-like extension 132 of a planet gear carrier or cage member 133. Sleeve 132 is secured against axial displacement in bearing 131 by a split ring 134 that abuts the inner race thereof, and is sprung into a groove located in sleeve 132. The inner wall of sleeve 132 is splined and cooperates with similar splines located on the outer wall of a secondary clutch sleeve 135. The splines of sleeve 132 abut the left hand ends of the grooves formed in member 135 by the splining operation, and the parts are held in assembled relation by means of a split ring 136, which is sprung in notches 137 located in the splines of member 135, and abuts the bottom of a recess 138 formed in member 133.

The rear end of shaft 9 is journalled in bushings 139 or the like located within sleeve 135. Shaft 9 and sleeve 135 are therefore rotatably mounted with respect to each other, and sleeve 135, and sleeve 132 carried thereby are rotatably mounted in bearing assembly 131.

Bearing support 128 constitutes a partition dividing housing 1 into a clutch chamber and a gear or torque multiplying mechanism chamber, and in order to prevent lubricant contained in the gear chamber from leaking into the clutch chamber between shaft 9, sleeve 135 and the bearing support, I have provided oil returning grooves 141 and 142 in sleeve 135 and bearing support 128 that cooperate with shaft 9 and the outer face of sleeve 135 respectively, to return any lubricant that may be disposed between these members to the gear chamber.

Planet gear carrier 133 is provided with recesses 143, which are disposed at preferably 120° intervals and receive the planet assemblies. Each planet gear assembly consists of a large planet gear 144 and a small planet gear 145, which are preferably integrally formed and are rotatably supported on a bushing 146, and a shaft 147. Shaft 147 is supported in aligned apertures 148 located in member 133. Oil ducts 149 and 151 are formed in gears 144 and 145 respectively for the purpose of affording access of gear lubricant to the space between bushings 146 and shafts 147. Gears 144 mesh with a sun gear 152, which is preferably integrally formed on the rear end of shaft 9.

Disposed in axial alignment with shaft 9, and mounted for rotation at its front end in a bushing 153, located in a recess in the rear end of shaft 9, is a driven shaft 154. Shaft 154 may be directly connected to the load handled by the transmission, or it may be connected to a gear reducing mechanism or the like, and it is journalled at its rear end in a bearing assembly 155 secured in an aperture in a cap member 155' which is bolted to housing 1.

Shaft 9 and gear 152 are provided with oil ducts 156 and 157 respectively for the purpose of insuring lubrication of shaft 154 and bushing 153.

The intermediate portion of shaft 154 is provided with splines 158, with which a correspondingly splined sleeve 159 is slidably associated. A pair of spaced flanges 161 are formed on the rear portion of sleeve 159, and are adapted to cooperate with a shifting device to be hereinafter described. Formed on the front portion of sleeve 159 are a plurality of clutch teeth 162, which are shown in Figure 1 as meshing or engaging with a plurality of internal clutch teeth 163 formed in a gear 164. Gear 164 is journalled for rotation on the reduced splined portion 165 of shaft 164, and meshes with planet gears 145.

A pair of washer elements 166 and 167 serve to restrain gear 164 against longitudinal movement.

Mounted for rotation in a bearing assembly 168, secured in a cylindrical bearing supporting portion 169 of housing 1 is the sleeve portion 171 of an internal gear 172, that meshes with planetary gears 144. The outer race of bearing assembly 168 is positioned in member 169 by a set screw 173, which in turn is locked by a wire 174 which is secured to a lug 175 formed on housing 1. Sleeve 171 is held against axial displacement within the inner race by a split ring 176 that is sprung into a groove in sleeve 171.

Mounted for limited oscillation upon support 169, by means of cap screws 178 is a ring like member 179. Screws 178 extend through arcuately shaped slots 180 in member 179 and are provided with shoulders 181 which abut the face of support 169. Screws 178 may accordingly be turned home without frictionally gripping member 179 between their heads and support 169.

Member 179 is provided with diametrically disposed fingers 182, which in this embodiment of the invention are engaged by plugs 183 which are threaded into housing 1 and are locked in place by lock nuts 184. With particular reference to Figure 4, it is observed that plugs 183 retain member 179 with the ends of slots 180 thereof in contact with screws 178, thereby restraining member 179 against oscillation. In a power transmitting mechanism shown in a co-pending application, member 179 is adapted to rock in response to variations in the torque impressed upon parts of the mechanism for automatically controlling the device, but in the present mechanism it is locked against movement and therefore merely functions as a stationary support.

Member 179 is provided with an annular recess 186 which is adapted to rotatably support a back-stop mechanism for an overrunning clutch. Rotatably mounted in member 179 is a clutch member 187, having recesses or cam pockets 188 formed in its interior. Overrunning clutch rollers 189 are disposed in recesses 188 and are adapted to cooperate with the outer face of sleeve 171. Rollers 188 and member 187 are restrained against left-hand axial movement by means of a ring 190 which is disposed between cooperating seats formed in members 169 and 179.

Referring to Figure 5, the outer faces 191 of recesses 188 are so inclined that counter-clockwise rotation of sleeve 171 with respect to member 187 tends to wedge rollers 189 between it and faces 191, and thereby lock sleeve 171 against rotation. Plungers 192, slidably mounted in recesses in member 187 are actuated by springs 193 to urge rollers 189 into wedging or locking relationship with sleeve 171 and faces 191. Mounted on a pin 193' secured to member 179 and adapted to oscillate in a guideway 194 formed in member 179 and having a latch portion which is adapted to be selectively engaged in notches 195 formed in member 187, is a latch 196.

Member 196 is provided with an arcuately shaped groove 197 which receives the arcuately shaped tongue portion 198 of an actuator member 199, and the parts are held in assembled interlocked relation by means of a plate 201 which is secured to member 199 by means of a rivet 202 and overlaps member 196. The axis of the mechanism constitutes the center of curvature for the arcuate portion of members 196 and 199, so that in the event that member 179 is designed to undergo limited rocking movements, it may do so without disrupting the connection between these members.

Rigidly secured to a shaft 203, which is journaled in bearings in housing 1, by means of a set screw 204, is a lever 205. Also mounted on shaft 203, but designed to freely rock thereon, is a lever 206. Lever 206 is provided with a latch portion 207, which is closely disposed between a pair of guide faces 208, and it is adapted to be selectively entered between teeth 209 formed on carrier member 133. A set screw 210 is threaded into lever 206 and seats in a groove 210' formed in shaft 203.

A resilient driving connection is established between lever 206 and shaft 203 by means of a torsion spring 211, which encircles shaft 203. One end of spring 211 is hooked into a groove 212 formed in shaft 203 and its other end is hooked over lever 206. When shaft 203 is rocked in a counter-clockwise direction (Figure 1) lever 206, through spring 211, is brought with its latching end into cooperation with teeth 209 for the purpose of locking carrier 133 against rotation. Should carrier 133 be so disposed that latch portion strikes the top of a tooth, shaft 203 may nevertheless be rocked into its final position because spring 211 yields under such conditions.

When shaft 203 is rocked in a clockwise direction for the purpose of bringing the lever out of locking engagement with teeth 209, the friction of spring 211 may be relied upon to effect a reverse drive between lever 206 and shaft 203, but I preferably provide a positive drive by so designing groove 210', that spring 211 holds lever 206 with screw 210 disposed in one end of it when the parts are disposed as seen in Figure 1, with the result that spring 211 is placed under a definite degree of pre-loading.

Screw 210 is accordingly adapted to transmit clockwise rotative efforts from shaft 203 to lever 206. A locking wire 214 is passed through an aperture in screw 204 and the hub of lever 205.

Pivotally connected to and disposed between the arms of lever 205, by means of a pin 215 or the like, are the arms of a U-shaped dog 216, which is in turn pivotally connected to member 199 by means of a pin 217. A tension spring 218 is looped over each end of pin 217 and is anchored to lugs 219 formed on lever 205. Springs 218 tend to urge dog 216 and member 199 downwardly (Figure 1), so as to bring latch member 196 into engagement with the teeth formed in member 179, and their action is limited by virtue of engagement of pin 217 with the bottom of recesses 221 formed in the arms of lever 205.

When shaft 203 is rocked in a counter-clockwise direction, latch member 196, through pin 217 and member 199, is withdrawn from the particular recess 195 with which it is engaged, and member 171 is freed for rotation in either direction. Although counter-clockwise rotative tendencies of sleeve 171 under the latter condition causes rollers 189 to be wedged between faces 191 and sleeve 171, to thereby lock members 171 and 187 together, member 187 merely rotates in member 179 as a journal.

In the event that when shaft 203 is rocked clockwise, so as to bring latch 196 into engagement with one of the recesses 195 in member 187, and the latter is not registered with latch 196, downward movement of lever 205 causes dog 216 to rock about pin 215 against the action of springs 218. The parts are maintained in position with pin 217 spaced from the bottom of recesses 221 until member 187 is rocked sufficiently to bring one of its notches 195 into registry with latch 196, at which time the latter will snap into place under the influence of springs 218 and again lock member 187, against counter-clockwise rotation.

Lever 205 is also preferably utilized to shift sliding clutch member 159, and to this end its lower end is forked, and secured in each fork portion thereof is a pin 222, which is adapted to seat between flanges 161 of member 159.

Rocking movement of shaft 203, through lever 205, is adapted to slide member 159 so as to bring its teeth out of engagement with teeth 163 into a neutral position, or into a further right-hand position with its teeth in engagement with teeth 223 formed on member 171 to condition the mechanism for reverse drive in a manner that will be presently set forth.

In order to facilitate the introduction of lubricant into gear member 172 from the lubricant reservoir, I preferably provide ports 237 in member 172, and in order to restrain the lubricant so admitted from being centrifugally thrown from the gear mechanism between members 172 and 133, a flange 238 is formed on member 172 and closely fits into a groove 239 formed in member 133. This construction provides a substantially fluid tight joint between members 133 and 172, but it is to be understood that any other suitable type of sealing assembly may be used in this relation if desired without departing from the spirit of the present invention.

Shaft 203 extends outwardly of housing 1 and may be actuated in any desired manner, but I preferably employ a Bowden wire assembly for operating it. A lever 224 is secured to shaft 203 and carries a member 225 which is swivelled thereto.

A control wire 226 is received in an aperture in member 225 and is secured therein by means of a set screw 227 or the like. Control wire 226 is enclosed in a flexible housing 228 and is led up to a convenient operating location in the vehicle as for instance, the dash 229 and it is provided with an actuating knob 231. The parts are shown in Figure 6 in "forward" drive position with the "neutral" and "reverse" drive positions being indicated in dotted lines.

Access to the gear chamber is gained through an opening in the side of housing 1, and which is closed by a removable cover 232.

If desired, frictional detent means, or other suitable mechanism, may be associated with the Bowden wire assembly for yieldingly holding the parts in their selected positions, but I preferably employ a spring detent (Figure 1) which takes the form of a resilient wire 233 which seats in a groove 234 formed in the splines of shaft 154. The integral splines formed in sleeve 159 are discontinued in the rear portion as shown in Figure 1 to provide a smooth cylindrical portion 235. Formed in cylindrical portion 235 are three grooves 236, which cooperate with wire 233 to yieldingly hold sleeve 159 in its various selected positions against inadvertent displacement.

The parts are so designed, that when shaft 203 is being oscillated to bring sleeve 159 into its intermediate position, with the clutch teeth 162 thereof out of engagement with clutch teeth 163 formed on gear 164, lever 205 is simultaneously actuated to cause latch member 196 to be withdrawn from latching engagement with member 187. When the parts are arranged in this condition, the mechanism is incapable of transmitting power from shaft 3 to shaft 9, and when member 159 is disposed in its extreme right-hand position, member 207 is designed to lock carrier 133 against rotation, and the mechanism is conditioned for reverse drive, and these operations will be more fully described hereinafter.

Gear member 172 is adapted to be selectively held against rotation, and in the present embodiment of my invention I preferably utilize a friction brake mechanism for effecting this result.

With particular reference to Figure 3 of the drawings, a brake band 241, having friction facings or linings 242 secured thereto by rivets 243 or the like, is disposed about the large diameter of member 172 and in this figure it is shown in disengaged condition. To one end of band 241 is riveted a forked member 244, which embraces a pair of pins 245 and 246 which are anchored in housing 1 in any well known manner. Member 244, through its anchoring means, not only restrains band 241 against rotation about the axis of the mechanism but it also maintains the upper side of band 241 in disengaged condition unless it is actually engaged under the influence of the engaging mechanism that is to be now described.

A bracket member 247, having a lug 248 and a slot 249, is secured to band 241 by means of rivets 251. A compression spring 252 is disposed between member 244 and lug 248 and is retained in place by means of plugs 253 and 254 which are secured to the respective members. Spring 252 tends to maintain band 241 in expanded condition with facings 242 thereof out of engagement with gear 172.

A brake shaft 255, having a cam 256 preferably integrally formed thereon, is mounted for rocking movement in a bearing support 257 which is integrally formed with housing 1. Shaft 255 is restrained against endwise displacement by means of a set screw 258 which is threaded into support 257 and engages in a groove 259 formed in shaft 255. A sealing assembly designated generally at 261, is associated with support 257 and serves to keep lubricant from working out of the housing.

Shaft 255 is provided with a reduced extremity 262, which engages in slot 249 and functions to restrain bracket 247, and band 241 connected thereto, from undergoing side wise movement.

Shaft 255 may be actuated in any desired manner, and when it is rocked, the nose of cam 256 forces lug 248 upwardly thereby causing band 241 to contract and bring its facings 251 into frictional engagement with gear member 172. When shaft 255 is restored to the position shown in Figure 3, cam 256 allows spring 252 to expand band 241 and free gear 172 from braking influences. The mechanism that is preferably employed for rocking shaft 255 will be hereinafter set forth.

*Secondary clutch mechanism*

Secured to a flange 264, provided on sleeve 135 by means of bolt assemblies 5a or the like, is a member 4a that supports the secondary clutch mechanism, and as the latter is similar in general to the primary clutch mechanism, like parts will not again be described.

In the secondary clutch, cover 26a is secured to member 4a, and fingers or levers 78a cooperate with a throwout assembly B, which is of a construction identical to that of assembly A, in a manner that will presently be set forth. Movement of reaction plate 38a toward and away from member 4a is controlled by means of a throwout shaft 265, having fingers 266 formed thereon which cooperate with throwout assembly B. Hubs 11a and 31a, carrying discs 14a and 33a, are preferably splined to a sleeve 264' which is secured to shaft 9 by means of keys 265', and a split ring 266' which is sprung into a groove in shaft 9.

Shaft 265 extends outwardly of housing 1 and may be actuated in any suitable manner, but I preferably employ a manually operable mechanism for controlling its operation. Referring particularly to Figure 7, a lever member 267, having a split hub, is clamped to shaft 265 by means of a scew 268 and also has an enlarged portion 269, into which a screw 271 is threaded. Screw 271 is adapted to be locked in place by means of a lock-nut 272, and is adapted to engage a lever 273 which is mounted for rocking movement on shaft 265.

A lever 274 is supported for rocking movement on housing 1 in any suitable manner and the lower end thereof is connected to lever 273 by means of a link 275. A detent plate 276, having notches 277, 278 and 279 formed therein is secured to housing 1 and is adapted to cooperate with a detent 281 carried by lever 274. Detent 281 is adapted to be actuated by a lever 282, which is pivotally supported on lever 274 and is pivotally connected to detent 281 by means of a pin 283.

With lever 274 disposed as shown in Figure 7, with detent in notch 278, shaft 265 assumes the automatic position shown in Figure 1, and if member 4a is rotating at a speed which is less than the speed responsive engaging speed of the secondary clutch, the plates will assume the disengaged condition illustrated in this figure. The parts are held in automatic position against the action of springs 45a by lever 274 acting through link 275, lever 273, screw 271, lever 267, shaft 265 and throwout assembly B. Lever 274 is preferably disposed in this position during normal driving operations.

When lever 274 is rocked so as to bring its detent 281 into notch 279, springs 45a are allowed to bring the plates into driving engagement, as explained in connection with the primary clutch.

When lever 274 is disposed with its detent in notch 277, the secondary clutch is fully disengaged, and it must be shifted into this position when it is desired to operate at fairly high speeds with the transmission in gear. Lever 274 must also assume this position when it is desired to secure amplified motor braking, and as it is necessary to restrain gear 172 against movement under this condition, I preferably interconnect lever 274 with the internal gear brake mechanism.

I preferably interconnect a lever 285, which is clamped to shaft 255 by means of a screw 286, to lever 267, by means of a resilient or yielding link device designated generally as 287, so that normal wear in the brake can be automatically compensated for. If desired, however, these parts may be connected by a rigid link or like structure.

With continued reference to Figure 7, a clevis member 288 connected to lever 285, is threaded into a sleeve 289 and the parts are adapted to be locked in adjusted relation by means of a lock-nut 291. Sleeve 289 is threaded into a cylinder 292, and a clevis member 293, having a reduced portion 294 is slidably associated with a cap 295' carried by cylinder 292 and it carries a pin 295 which is disposed in an arcuate slot 296 formed in lever 267. A compression spring 297 is located in cylinder 292 and is disposed between sleeve 289 and a washer 298 which abuts the shoulder formed on member 294. A split ring 299 is sprung into a groove located in cylinder 292 and serves to pre-load spring 297 and prevent it from forcing member 298 out of the cylinder.

A lubricant fitting 301 is screwed into cylinder 292 and serves to admit any suitable form of lubricant to the interior of the cylinder. In order to prevent lubricant from leaking out of the cylinder I preferably provide a sealing or packing assembly 302, which is disposed between cap 295' and ring 299.

When lever 274 is rocked so as to bring its detent into notch 277, the parts of link 287 move as a unit during the initial part of the operation in view of the fact that spring 297 is under considerable stress or is pre-loaded. This results in lever 285 rocking shaft 255 and causes cam 256 to apply the brake to gear member 172. When the brake band has been fully contracted through the operation just described, further movement of lever 274 and the associated parts, causes member 294' to telescope within cylinder 292 and it compresses spring 297, with the result that the pressure applied to the brake is slowly built up.

Primary clutch throwout shaft 110 extends outwardly of housing 1 and may have a latch mechanism of the character shown in co-pending application Serial No. 606,238, filed April 19, 1932, associated with it for controlling its operation, but I preferably employ an automatic device for operating it which not only disposes the parts of the primary clutch in disengaged position when the prime mover is started, but it is also adapted to introduce a power or torque-responsive phase into the operation of the clutch when the prime mover is accelerated for the purpose of automatically picking up the load.

With particular reference to Figure 6, a lever 305 is secured to shaft 110 by means of a key 306 or the like, and has a downward extending arm 307 to which one end of a tension spring 308 is secured. Spring 308 is anchored to any suitable part of the mechanism by means of a bracket 309, and serves to urge shaft 110 into retracted position, with forks 109 out of contact with throwout assembly A. Threaded into an enlarged, axially offset portion 311 formed on lever 305 is a screw 312 which is adapted to be locked in adjusted position therein by means of a nut 313, and which cooperates with a lever 314 which is journalled on shaft 110.

Lever 305 is adapted to be pulled toward disengaging position by means of a vacuum operated mechanism to be hereinafter described, and a latch mechanism is associated with lever 314 for selectively arresting the parts in automatic position. This latch may be constructed in any desired manner and may be of any suitable form, but it is preferably constructed as follows.

A link member 315 is connected to lever 314 by means of a pin 316 and is connected to a similar link member 317 by means of a pin 318. Links 315 and 317 are provided with faces 319 and 321 respectively, which are adapted to abut as seen in Figure 6, and they are urged toward this position by means of a tension spring 322, which is hooked into a member 323 pivoted to pin 318, and an eye 324 formed on lever 314. Link 317 is journalled on a pin 325 which is adapted to be supported in any suitable manner, as for instance by the prime mover with which the mechanism is associated.

Links 315 and 317 form in effect a toggle, and in Figure 6 they are shown in locked or latched condition with their faces abutting, and screw 312 is shown as being engaged with lever 314, under the influence of the vacuum mechanism, and under these conditions the primary clutch throwout shaft and bearing assembly assume the position shown in Figure 1. The links are adapted to be moved out of locked condition against the action of spring 322 by means of a Bowden wire assembly consisting of a wire 326, which extends through an aperture in an upwardly extending arm 327 of member 323 and has an enlarged end 328, and a flexible sheath 329, which is connected to dash 229 by means of a nut 331, and whose lower end is carried by a bracket 332 which is anchored to any suitable support. A control knob 333 is connected to wire 326, and when it is withdrawn, links 315 and 317 are pulled upwardly past dead center against the action of spring 322. In the event that the vacuum mechanism is tending to rock levers 305 and 314 in a counter-clockwise direction at the time knob 333 is pulled out, lever 314 forces the links into the dotted line position shortly after they have been pulled past dead center through actuation of knob 333.

When the vacuum or other mechanism releases lever 305 and allows the parts to move toward engaged position under the influence of springs 45, and knob 333 is in, spring 322 restores the links to latched condition as soon as automatic position is attained. Further movement of the throwout parts toward engaged position is not restricted by the links as screw 312 merely moves away from lever 314 under such conditions.

Although I have shown a manually operable knob for actuating the Bowden wire assembly, it is to be understood that a foot pedal or the like may be interconnected with wire 326 and a perfectly satisfactorily operating mechanism obtained. Moreover, any suitable linkage mechanism other than a Bowden wire assembly, or a vacuum or electromagnetically actuated device, may be used for actuating links 315 and 317 if desired without departing from the spirit of the present invention. If desired, a pedal may be connected to shaft 110 and employed to declutch the mechanism by pulling out knob 333 so as to shift the links out of locking relation and depressing the pedal, but I preferably effect this operation by a power operated mechanism that will now be described.

Connected to the upper end of lever 305, by means of a clevis 341 and a pin 342, is a link 343 which is threaded into a sleeve 344. Sleeve 344 constitutes a piston rod and extends into a cylinder 345 which is supported by means of a bracket 346 on any part of the mechanism by means of a cap screw 347.

A pair of plates 348, having a piston member 349 disposed between them, are clamped to the end of sleeve 344 by means of a cap screw 351 which is threaded therein. Cylinder 345 is provided with a head 352 having an apertured bleed member 353 whose aperture aligns with a similar aperture formed in head 352. Sleeve 344 is disposed in closely fitting sliding engagement with a member 354 secured to head 352, and which constitutes a combined guiding and valving assembly. Sleeve 344 is further provided with a pair of apertures 355 and 356 which cooperate with member 354 in a manner that will hereinafter appear.

The piston and cylinder assembly just described may be operated by any suitable fluid, but in the present instance it is operated by the vacuum established in the intake manifold of, and incident to operation of an internal combustion engine 357, and to this end a vacuum line 358 is tapped into the left hand side of cylinder 345 and is tapped into the body 359 of a controlling valve 361, which is supported in any suitable manner (not shown). Valve 361 is provided with a vertical passage 362 through which air is adapted to pass between the intake manifold and the cylinder. A valve member 363, having a reduced portion 364 is slidably mounted in a horizontal bore 365 located in valve body 359. Valve 363 is adapted to be actuated by means of a rod 366 which is connected thereto by means of a cotter pin 367 or the like. Rod 366 is preferably connected to the accelerator assembly of the motor vehicle in which the mechanism is mounted, and with the parts disposed in the position shown in Figure 6, the accelerator is fully released. A pipe 368 is tapped into valve body 359 and is connected to the intake manifold 369 of the internal combustion engine in any well known manner. An intake port or aperture 371 intersects bore 365 and is adapted to cooperate with reduced portion 364 of member 363.

With the parts in the position shown in Figure 6, the intake manifold is placed in communication with the cylinder 345, and if the engine is operating substantially at idling speed, the throwout mechanism will assume the position in which it is shown in Figure 1, with reaction plate 38 held in automatic position. When valve member 363 is shifted to the left in response to depression of the accelerator, reduced portion 364 thereof is brought into registry with aperture 371, with the result that air is allowed to comparatively rapidly pass through aperture 371, around reduced portion 364, through a passage 372, and pipe 358, and into the left-hand end of the cylinder, with the result that the piston may move to the right in response to the action of the clutch springs I prefer to employ a valve member which is operated substantially in accordance with the power delivery-controlling mechanism of the prime mover, as it provides definite control of the flow of air to and from the cylinder assembly, but it is to be understood, that if desired, pipe 358 may be tapped directly into the intake manifold if it is located so that the pressure variations are properly coordinated with the magnitude of the power output of the prime mover to provide the desired operation of the cylinder assembly, or suitable automatic valve devices may be utilized for this purpose, and the appended claims are intended to embrace my novel mechanisms when they are controlled in this manner.

With the latch parts disposed in the positions shown in Figure 6, and with the engine at rest, atmospheric pressure exists in intake manifold 369 and the clutch springs, acting through the throwout assembly, levers 78, and shaft 110, hold the piston in the right hand end of the cylinder, and as the plates are engaged under these conditions, a driving connection is established between shafts 3 and 9.

When the engine is started, with valve 363 disposed in the position shown in Figure 6, and with the latch disposed in latching position, the resulting vacuum established in the intake manifold pulls the piston to the left into automatic position, as shown in Figure 6. The parts are held in this position against the action of the piston by lever 314, which engages screw 312.

When the parts are disposed in automatic position and the engine is operating substantially at idling speed, the clutch parts assume the disengaged or released condition illustrated in Figure 1, and if it is desired to establish a driving connection between shafts 3 and 9, the accelerator is depressed to automatically bring the clutch plates together in a manner that will now be described.

As the engine is accelerated, weights 56 rock outwardly and bring the plates together in the manner previously set forth, but prior to completion of this action, accelerator rod 366 shifts valve 363 so as to bring its reduced portion 364 into registry with port 371, with the result that atmospheric air is admitted to the left-hand end of cylinder 345, thereby allowing springs 45 to pull the piston to the right. This action is resisted, however, as an air cushion exists in the right-hand end of the cylinder by reason of the fact that port 355 is cut off by member 354, and the air contained in the right hand end of the cylinder is compelled to escape through the comparatively restricted bleed passage 353, with the result that movement of the parts toward engaged position is retarded. In this form of the invention the retarding action is preferably sufficient to allow weights 56 to complete their engaging operation prior to the time the piston reaches the right-hand end of the cylinder.

Shaft 9 is accordingly automatically picked up with a solely speed-responsive drive, and if it is desired to disengage the clutch for any purpose, knob 333 is pulled out and the accelerator is released. Release of the accelerator restores valve 363 to the position shown in Figures 6 and 8, and closes the engine throttle to idling position, with the result that the piston is pulled into its extreme left-hand position and moves the parts into fully disengaged position. The plates are accordingly disengaged irrespective of any engaging tendencies that may be manifested by weights 56 as the result of engine momentum maintaining the clutch above its speed-responsive engaging speed while this operation is being effected.

When the parts are held in automatic position by the cylinder assembly, and it is desired to re-engage the clutch, the accelerator is depressed and the re-engaging action takes place in the following manner.

Depression of the accelerator causes the engine to accelerate, and also moves valve 363 into its left-hand position, which places cylinder 345 in communication with the atmosphere. The piston assembly is accordingly allowed to move to the right, under the influence of springs 45 acting through levers 78, and throwout assembly A. When this operation is taking place, air bleeds into the left-hand end of cylinder 345 by way of port 371, reduced portion 364, passage 372, and pipe 358. Air also bleeds out of the right-hand side of the cylinder through port 355, sleeve 344, and port 356. Some air is also bled to the atmosphere through bleeder aperture 353. In view of the fact that the exhaust of air from the right hand end of the cylinder under these conditions is substantially unrestricted, movement of the parts toward automatic position is comparatively rapid if no other provision is made for retarding their movement.

When the piston has moved preferably to within three-eighths of an inch of automatic position during the operation just described, sleeve 344 is brought with its port 355 adjacent member 354, with the result that further movement of sleeve cuts off port 355, and causes air to be compressed in the right hand end of the cylinder, as air can now only escape therefrom through the relatively small aperture 353. The parts are preferably so designed that port 355 is cut off, and stable air pressure conditions are attained in the right hand end of the cylinder just prior to the time that the piston assembly, which is now undergoing relatively slow movement under the retarding action manifested by the action of air escaping from orifice 353, attains automatic position.

The parts are preferably so designed that when the piston and throwout assembly have attained automatic position during the operation just described or shortly thereafter, weights 56 rock outwardly in the manner previously described, and bring the plates into frictional engagement with the result that the vehicle or other load handled by the transmission is smoothly picked up. As the engine is further accelerated, weights 56 swing further outwardly and produce a further pressure build-up between the plates, and the piston continues to move slowly to the right, now under the influence of spring 306, as operation of the weights has caused reaction plate 38 to move to the right and thereby relieved levers 78 of the pressure of springs 45.

When the piston assembly attains automatic position under the influence of the bleeding operation just described, links 315 and 317 are restored to the position shown in Figure 6 under the influence of spring 322. The parts are accordingly locked, and should the accelerator be released when the clutch has been fully engaged in the manner just described, the resulting high vacuum produced in the intake manifold does not produce clutch disengagement, by reason of the fact that lever 314 and its associated latch prevents the throwout assembly from being moved past automatic position under the pull of the piston assembly.

In the event that the accelerator is depressed to a substantial extent, and the engine is pulling a heavy load, and the speed of shaft 3 is decelerated to a speed which is lower than the speed-responsive operating speed of weights 56, the clutch nevertheless remains engaged under the influence of springs 45 for the reason that cylinder 345 is open to the atmosphere. Moreover, should pipe 358 be tapped directly into the intake manifold, the clutch would remain engaged by reason of the fact that at low engine speeds the vacuum is low when the throttle is open.

When the facings of the primary clutch undergo sufficient dimensional changes, as the result of particles thereof wearing away during operation, to establish too great a clearance between the plates when the latter are disposed in automatic idling position, which has the effect of delaying clutch engagement in response to acceleration of the driving shaft, and diminishing the driving pressure, lock-nut 313 may be loosened and bolt 312 screwed up sufficiently to re-establish proper idle release clearance, and nut 313 tightened to lock the parts in adjusted position. The effect of this operation is to dispose the reaction plate closer to the flywheel and thereby decrease the idle release clearance.

The engaging operation of the mechanism just described is fully responsive, i. e., the bleeding action of the piston lags behind the action of the automatic weights during normal acceleration and it therefore does not influence the clutch engaging operation, whether the parts are bled to fully engaged position from disengaged or automatic position. In another embodiment of my invention which I intend to be embraced by the present application, aperture 353 is of a slightly larger dimension, so that the engaging operation takes place in the following manner.

With the parts held in automatic position, either by the latch mechanism or by the momentary checking influence that aperture 353 exerts upon the piston when the latter approaches automatic position, springs 45 are placed under compression or are pre-loaded, and acceleration of the driving shaft causes weights 56 to bring the plates into engagement in the manner previously described. When weights 56 have built up a predetermined pressure between the plates, which is of smaller magnitude than the preloading of springs 45, the checking influence of bleed apertures 353 proceeds sufficiently to allow the piston and throwout mechanism to relieve levers 78 of substantial pressure and thereby impose the full pressure of springs 45 upon the plates. With this form of the invention, clutch engagement accordingly occurs in two stages, first, a speed-responsive stage, wherein the plate pressure is built up comparatively slowly and the load accordingly picked up smoothly, and secondly, a power or torque responsive stage, wherein the full driving pressure of the clutch springs is applied to the plates in response to attainment of certain conditions in the prime mover, and preferably brings the parts into synchronism comparatively rapidly.

In connection with this form of the invention, it is to be understood that any suitable automatic or accelerator pedal operated valve mechanism may be associated with the vacuum line for effecting or assisting the above described pressure staging operation, if desired, without departing from the spirit of my invention. Moreover a valve may be inserted in pipe 358 for the purpose of establishing communication between the cylinder and the atmosphere at will, to thereby allow the plates to be brought into engagement under the influence of springs 45 when the engine is operating at speeds which are below the speed-responsive operating speed of weights 56 if desired.

Power may be taken from shaft 154, but in the present instance the mechanism is designed for use in motor vehicles and to this end shaft 154 is provided with splines 381, upon which a corresponding splined member 382 is mounted. Member 382 is provided with a flange 383 to which a universal joint (not shown) is adapted to be secured, and it is held in place on shaft 154 by means of a nut 384 which is threaded on a reduced portion thereof. Nut 384, acting through sleeve 382 holds the inner races of bearing assembly 155 in place against a flange 385. A worm gear 386 is secured to sleeve 382 and meshes with a gear 387 for driving a vehicle speedometer drive in well known manner. A sealing assembly 388 is secured in cap member 155' and cooperates with the outer surface of sleeve 382 to prevent grease from leaking from the housing. A passage 389 is provided in cap member 155' for the purpose of returning grease to the gear chamber.

General operation

The operation of the mechanism will now be described. When driving shaft 3 is operating at a predetermined speed, for example at a speed corresponding substantially to the idling speed of the prime mover utilized therewith, there is no driving connection between shafts 3 and 9, as the primary and secondary clutches are disengaged as illustrated in Figure 1. With levers 205 and 206 disposed in the positions shown in this figure, and lever 274 disposed in the position illustrated in Figure 8, the mechanism is provisioned or conditioned for forward drive, and acceleration of the driving shaft causes the automatic power transmitting operation to take place.

Low speed or torque multiplying drive

As the driving shaft is accelerated, centrifugal weights 56 fulcrum outwardly in response to centrifugal force and cause the primary clutch mechanism to be engaged in the manner previously described, thereby coupling shafts 3 and 9. Clockwise rotation of shaft 9, viewed from the left-hand end of Figure 1, through the medium of pinion 152 formed thereon, tends to produce counterclockwise rotation of planet gears 144 about their axes, assuming that rotation of shaft 154 to which they are connected through gears 145 and 164, and sleeve 159, is resisted by a load, or the like. Counter-clockwise rotative tendencies of planet gears 144, imposes a reaction upon internal gear 172, tending to produce counter-clockwise rotation thereof. Counter-clockwise rotation of internal gear 172 however is prevented by the action of clutch rollers 189, which cooperate with sleeve 171 and member 179 under these conditions to lock sleeve 171 against rotation. Planet gears 144 are therefore caused to planetate clockwise within stationary internal gear 172. Planetation of gears 144 produces similar planetation of gears 145 to which they are connected. Planetation of gears 145 causes gear 164 to be rotated in the same direction but at a speed which is lower than that of gear 152 carried by shaft 9, by reason of the fact that it is of greater diameter. A torque multiplying coupling is therefore automatically established between driving shaft 3 and driven shaft 154, the torque amplification depending upon the gear ratios utilized.

Normal automatic transition from torque multiplying drive to direct drive

With shafts 3 and 154 coupled through the medium of pinions 152 and 164, and planet gears 144 and 145, as previously explained, when shaft 154 attains a speed corresponding to a speed of the prime mover sufficiently high to enable the latter to deliver adequate torque to handle the load without torque multiplication, centrifugal weights 56a pivot outwardly and cause engagement of the secondary clutch mechanism to be effected in the manner previously described. Engagement of the secondary clutch mechanism causes torque to be transmitted from shaft 9, through discs 14a and 33a, member 264, sleeve 135, and gears 152, 144, 145, 164 and member 159, to the driven shaft, and the latter is accordingly gradually accelerated under the combined influence of the torque multiplying drive and the direct torque transmitted through the secondary clutch mechanism.

When the secondary clutch is fully engaged, a direct drive exists between shafts 9 and 154 because the driving sun gear and the planet carrier are coupled together, which prevents planets 144 and 145 from rotating about with the result that the internal gear is caused to rotate in a clockwise direction, which in turn causes disengagement of rollers 189 from their wedging disposition between sleeve 171 and member 179.

The mechanism accordingly initially picks up the load with a slipping drive, which, when an internal combustion engine is utilized as the prime mover, allows the engine to accelerate and operate efficiently on a relatively high point on its speed-torque curve to develop adequate power to handle the comparatively great starting load involved in picking the vehicle up from a standstill. After the vehicle is moving, and has attained a predetermined speed, the primary clutch directly connects shafts 3 and 9 in the manner previously described. At a higher vehicle speed (assuming that the engine is continuously accelerated), the secondary clutch initiates operation and serves to transmit increasing amounts of power directly from shaft 9 to planet carrier 133, with the result that a differentiating power transmitting operation takes place, and transmits power from shaft 9 to shaft 154 with a decreasing torque multiplication.

In the particular mechanism shown, and with the usual rear axle ratios utilized in most vehicles of the pleasure car class, the primary clutch directly couples shafts 3 and 9 when the vehicle attains a speed of approximately ten miles per hour, and the secondary clutch initiates operation at a vehicle speed of approximately seventeen miles per hour and establishes a direct drive between the engine and the load when the vehicle attains a speed of twenty-eight miles per hour when the engine is accelerated in the manner just described. It is to be understood however that completion of primary and secondary clutch operation may take place at higher or lower speeds than those given, depending upon whether the transmission is under heavy or light loads.

An extremely important feature of the present invention resides in the fact that although the mechanism, in response to one continued acceleration of the driving shaft, automatically establishes a torque multiplying connection between the engine and the load when the driving shaft attains a predetermined speed, and automatically brings the load into direct synchronism with the engine when the load has been eccelerated through a predetermined "geared speed" range under the influence of the torque multiplying drive, once the direct drive has been established, it will be maintained even though the load be decelerated so that it is operating at speeds corresponding to those of the "geared speed" range. This is a highly desirable operating characteristic for the reason that as the "shift up" speed is substantially higher than the "shift down" speed, there is no critical shift speed, and the transmission therefore does not tend to alternately shift into and out of direct drive, no matter through what speed range the parts are operated or whether the torque handled by the transmission is of large or small magnitude.

The novel design of my transmission also makes it possible to automatically shift the parts into direct or non-torque multiplying relationship when the load is operating in the major portion of the normal "geared speed" range, by merely momentarily effecting a reversal of drive, which in the present invention, is effected by momentarily releasing the accelerator. This makes it possible for the operator to shift into direct drive at will when the transmission is operating in a certain speed range, and this operation may be silently affected with a minimum of effort as it merely involves momentarily releasing the accelerator.

These highly desirable operating characteristics are made possible through the design of the torque multiplying mechanism employed in my transmission and the manner of association of the drive transition effecting device with it, which in the present instance takes the form of a speed responsive clutch. The clutch is related to the parts in such manner that the driving shaft rotates the speed-responsive part thereof at a greater speed when it is engaged than when it is disengaged, and so that when it is disengaged, it is given an accelerating impulse when a reversal of drive occurs and the driven shaft tends to transmit rotative efforts to the driving shaft. These operations, and the structural features of the mechanism which render them possible, will now be more fully set forth.

When operating a vehicle provided with the present transmission in direct drive, and it is desired to decelerate to stop the vehicle, this accelerator is released and the vehicle brakes are applied. This operation results in shaft 154 tending to drive shaft 9, through gears 164, 145, 144 and 152, and sleeve 171, and the secondary clutch. Shaft 9, through the engaged primary clutch (release of the accelerator has resulted in the vacuum cylinder pulling the parts into automatic position, but as the speed of shaft 9 is maintained above the operating speed of weights 56, they keep the clutch engaged), tends to drive the engine. A direct drive accordingy exists between the load and the engine, and the braking effect of the latter is accordingly utilized to augment the action of the vehicle brake mechanism.

As the decelerating operation just described proceeds to the point where shaft 154 is rotating at the speed where the secondary clutch initiated engagement during the accelerating operation previously set forth, the secondary clutch nevertheless remains engaged and maintains a direct drive between shafts 9 and 154 for the reason that the speed responsive part of the clutch (member 4a) is now being driven directly from shaft 9 through discs 14a and 33a, and it accordingly rotates at a higher speed than when it was driven through the action of the gears for a corresponding speed of shaft 154.

If the decelerating operation is continued until the vehicle attains a speed of ten miles per hour, the hold-back springs of the secondary clutch overcome the forces set up by weights 56a, and cause them to rock inwardly and disengage the plates.

The fact that the transmission shifts into, or establishes a direct drive at a speed which is higher than that at which the transmission tends to shift out of direct drive, is regarded as a highly important feature of the present invention because it positively eliminates any tendency for the transmission to alternately shift into and out of direct drive, or "hunt" when the parts are rotating at speeds which are in the neighborhood of the operating speed of the direct drive establishing mechanism, which, in the present embodiment of the invention, comprises a speed-responsive clutch.

When the secondary clutch has been disengaged in the manner just described, shaft 154 does not drive the engine through the gears because the planet gears exert forwardly driving tendencies upon the internal gear and cause it to overrun, which has the effect of disconnecting shafts 9 and 154. As soon as the internal gear overruns, the engine drops to idling speed, as the throttle is closed, and the hold-back assemblies disengage the primary clutch. The vehicle may then be brought to a complete stop through continued application of the vehicle brake mechanism, or, if desired, the accelerator may be depressed to produce automatic engagement of the primary and secondary clutches in the manner previously described so as to again cause the engine to propel the vehicle.

When the transmission is operating in direct drive in the manner previously described, and it is desired to maintain the direct drive thus established, even when the parts are decelerated to speeds lower than the automatic "shift down" speed, lever 274 may be rocked so as to bring detent 281 into notch 279, to thereby allow springs 45 to bring the secondary clutch plates into driving engagement. This operation conditions the parts so that a two-way direct drive is maintained between the engine and the load until shafts 3 and 9 are decelerated sufficiently for the primary clutch to automatically disengage.

By reason of the novel design of my transmission it is possible to effect the transition from geared drive to direct drive by merely momentarily releasing the accelerator when the vehicle or other load is being driven within a speed range which may be predetermined as desired by properly designing the parts and providing the proper gear ratios. This operation takes place as follows:

*Selective automatic shift into direct drive*

With the engine driving the vehicle through the transmission gears as previously explained, and with the vehicle proceeding at a speed of from approximately ten to twenty-eight miles per hour, if the accelerator is released, the transmission automatically shifts into direct drive, the operation taking place in the following manner:

Assuming that the speed of member 4a is so low that engagement of the secondary clutch has not been initiated, accelerator release causes shaft 154, acting through member 159 and gear 164, to tend to increase the rate at which gears 144 and 145 planetate. This action causes rotative forces to be applied to gear 152, but as it is connected to shaft 9 and the engine, which tends to drop to idling speed, planet gears 144 apply forwardly driving forces to, and cause internal gear 172 to rotate forwardly or overrun. This results in a substantial acceleration of the speed of carrier 133, and as it is connected to member 4a, which carries the speed-responsive mechanism of the secondary clutch, weights 56a rock outwardly and establish a driving connection between shaft 9 and carrier 133, in the manner previously set forth.

A direct drive is thereby established between shafts 9 and 154, and as the accelerating forces are promptly applied to the speed-responsive part of the secondary clutch mechanism, upon release of the accelerator it remains engaged during this operation. After the operation is complete, and before the accelerator is again depressed, the rotation of shaft 154 under the influence of the momentum of the vehicle, through the direct drive established by the secondary clutch, maintains shaft 3 up to the operating speed of weights 56, and thereby maintains the primary clutch engaged, provided that the vehicle does not lose sufficient momentum for shaft 154 to drop to or below the disengaging speed of the primary clutch.

Assuming that the transmission has been selectively shifted into direct drive in the manner just described, if the accelerator is depressed, the vehicle will be picked up in direct drive. The secondary clutch remains engaged under these conditions for the reason that its speed responsive mechanism is now being driven from shaft 9 in direct synchronism therewith, whereas before engagement of the secondary clutch took place it was being driven at speeds less than its actuating speed, through rotation of carrier 133 which is "geared down" with respect to shaft 9. A further reason why the secondary clutch remains engaged under these conditions resides in the fact that the plates thereof were brought together into direct non-slipping engagement with no load on them by the accelerator releasing action, and as static friction is greater than dynamic, or slipping friction, the plates will remain in non-slipping engagement down to speeds lower than that which would be required to bring them into non-slipping engagement if they were transmitting considerable power and slipping.

When operating the transmission in direct drive with the vehicle proceeding at speeds of from ten to seventeen miles per hour, and a steep grade is encountered or the engine throttle is opened so as to deliver considerable power for some other reason, this causes a heavy torque or considerable load to be placed upon the transmission, with the result that the secondary clutch starts to slip. In view of the fact that the speed responsive part of the secondary clutch is driven by shaft 9 only when it is engaged, the slipping operation, provided the heavy torque conditions continue to exist, is of short duration as the speed of member 4a comparatively rapidly falls below the engaging speed of the secondary clutch, and the transmission accordingly comparatively promptly shifts or drops back into geared drive. When the vehicle has been accelerated through the geared drive to a sufficiently high speed, the secondary clutch engages and re-establishes a direct drive in the manner previously set forth, or, if the load diminishes, the transmission may be shifted into direct drive by momentarily releasing the accelerator, as just described.

*Amplified motor braking*

With the present power transmitting mechanism installed in a motor vehicle or the like, direct drive or high gear motor braking during normal operating conditions is obtained in the manner previously explained. Under some conditions, for example, in descending long mountain grades, it is desirable to materially augment the action of the vehicle brake mechanism by causing the momentum of the vehicle to be applied to the engine through the torque multiplying mechanism. Under normal coasting operating conditions, internal gear 172 is allowed to overrun without applying the braking torque of the engine to be applied to shaft 154 when the secondary clutch is disengaged, and I have therefore provided means that may be selectively employed to hold internal gear 172 stationary at will, in order to impose the braking effect of the engine upon the load.

If the vehicle is proceeding with the secondary clutch disengaged, and with the torque multiplying mechanism overrunning, lever 274 may be oscillated to bring detent 281 into notch 277 of the detent plate, thereby rocking shaft 255 and applying the brake as previously explained. This operation establishes a torque multiplying connection between shafts 154 and 9, and if the accelerator is depressed slightly so as to cause the engine to accelerate sufficiently to cause the primary clutch to engage, release of the accelerator will cause the braking effect of the engine as amplified by the gear mechanism to be applied to shaft 154. In the event that the primary and secondary clutches are engaged when lever 274 is actuated, shaft 265 disengages the secondary clutch and applies the brake to the internal gear, with the result that a geared drive is established between shafts 9 and 154. In amplification of the details of this operation, shafts 3, 9 and 154 are rotating synchronously with gear 172 when the primary and secondary clutches are engaged. Operation of lever 274 preferably initially disengages the secondary clutch through throwout assembly B and levers 78a. If the accelerator is released while this operation is taking place, the momentum of the vehicle, acting through shaft 154 and gears 164, 145 and 144 tends to accelerate gear 172, but the parts are preferably so designed that the brake is applied to the gear slightly before, or at the point of completion of secondary clutch disengagement, with the result that gear 172 is decelerated. In view of the fact that the driving faces of the planet gear assemblies are applied to internal gear 172 and sun gear 152, and the former is being decelerated under the influence of the brake, sun gear 152 is driven at increasing speeds, providing the momentum of the vehicle is sufficient to drive shaft 154, and when gear 172 has been brought to rest under the influence of the brake, a positive geared drive exists between shafts 154 and 9, and as the latter is driven at an amplified speed with respect to the former, an amplified engine braking effort is imposed upon shaft 154 for controlling the coasting tendencies of the vehicle.

When it is desired to restore the parts so as to provide automatic operation, lever 274 is shifted so as to bring its detent 281 into notch 278. In the event that member 4a is rotating at sufficient speed to maintain weights 56a in their outer positions when lever 274 is rocked in this manner, this operation brings the plates of the secondary clutch into engagement, with the result that gear 172 is brought into synchronism with shafts 9 and 154, and the transmission operates in direct drive. Should member 4a be operating at speeds which are below the operating speed of weights 56a when lever 274 is restored to its normal position, the secondary clutch remains disengaged and if the engine is driving the vehicle, gear 172 takes the reactive forces of the planet system and remains stationary against the action of the overrunning clutch, with the result that the transmission operates in geared speed. If desired, the engine may be accelerated in the manner previously described to automatically bring the parts into direct drive.

As it is possible to shift into or out of geared drive at any time, irrespective of the speed of the vehicle or the engine because no synchronizing problems are present, the mechanism is extremely flexible and is fool-proof, even in the hands of an inexperienced driver.

High speed geared drive

In ascending long mountain grades, that are too steep for the engine to handle the vehicle in direct drive, it is desirable to prevent the automatic transition from indirect to direct drive from taking place, so that the engine may be utilized to propel the vehicle through the torque multiplying mechanism, at speeds in excess of that corresponding to secondary clutch engagement speed so as to avoid improper and undesirable slippage of the latter.

In order to condition the mechanism for this operation, lever 274 is rocked so as to bring detent 281 into engagement with recess 277 in the same manner as that described in connection with the motor-braking operation just described. Under these conditions, shaft 154 may be driven by, and accelerated through pinion 152, planet gears 144, and 145, and stationary internal gear 172 to any desired speed without producing automatic engagement of the secondary clutch because throwout assembly B holds reaction plate 38a in fully disengaging position. In the event that the secondary clutch is engaged when lever 274 is operated, throwout assembly B disengages it, and brake band 241 brings the internal gear to rest, thereby promptly establishing a geared drive between shafts 9 and 154.

Although band 241 holds internal gear at rest under these conditions, it is superfluous insofar as forward drive is concerned, because, as has been previously explained, clockwise rotation of pinion 152 causes planet gears 144 to react against, and tend to produce counter-clockwise rotation of internal gear 172. Counter-clockwise rotative tendencies of internal gear causes rollers 189 to lock it against rotation. The secondary clutch and the brake may therefore be separately operated to provision the mechanism for the operation just described, but they are preferably interconnected for the purpose of simplifying the design of the control mechanism therefor. Band 241, under these conditions, restrains movement of gear 172 in a counter-clockwise direction, and therefore should a reversal of drive occur, and shaft 154 tend to overrun with respect to shaft 9, when the parts are disposed in this position, amplified motor braking is obtained. Operation of the brake for the internal gear and the release mechanism for the secondary clutch simultaneously in this manner therefore provisions the mechanism for permanent or high speed gear operation, and at the same time provisions it for amplified motor braking, and the control mechanism is accordingly simple in design.

However, should it be undesirable, in the particular type of drive involved, to apply a braking influence to gear 172 when the secondary clutch is disconnected for obtaining a permanent torque multiplying drive, the secondary clutch and shaft 255 may be independently actuated, and it is to be understood that this method of their control is also embraced by the present invention.

Reverse drive

The gear mechanism employed for effecting forward torque multiplying drive is also utilized to obtain reverse drive. Carrier member 133 is adapted to be locked against rotation in the manner previously set forth when reverse drive is employed.

When it is desired to condition the mechanism for reverse drive, shaft 203 is oscillated by withdrawing knob 231 into its outermost position, to cause latch member 207 to enter the space between two adjacent teeth 209 formed on cage or carrier member 133, thereby locking the carrier and sleeve 135 against rotation. Oscillation of shaft 203 in this manner is preferably designed to cause lever to be withdrawn from the particular notch with which it is engaged in member 187, and to simultaneously shift sliding clutch 159, into a position where the clutch teeth 162 thereof are engaged with internal clutch teeth 223 formed on the inner wall of sleeve 171.

With shaft 203 oscillated in this manner, the parts are disposed in reverse drive condition, and acceleration of the driving shaft causes the primary clutch mechanism to automatically couple shafts 3 and 9 in the manner previously described, and clockwise rotation of pinion 152, carried thereby, produces counter-clockwise rotation of planet gears 144 and 145 about their axes. The axes of the planet gears are restrained against planetary movement because of the locked condition of the carrier member 133 at this time. Counter-clockwise rotation of planet gears 144 produces similar rotation of internal gear 172, and driven shaft 154 to which it is coupled by clutch member 159. In view of the fact that sleeve 135 is held stationary, the secondary clutch mechanism is maintained in disengaged or inoperative condition regardless of to what extent shafts 9 and 154 are accelerated in reverse drive. During this operation, planet gears 145 drive gear 164 in a clockwise direction, but as the latter is disconnected from clutch member 159, it merely idles on the forward end of shaft 154. Member 187 also rotates within member 179 in a counter-clockwise direction when reverse drive is taking place, but as these parts are not under load under these conditions, no bearing devices are required.

Should latch member 207 strike one of the teeth 209 carried by member 133 when shaft 203 is rocked, it will remain so engaged until rotation of shaft 9 produces a slight movement of member 133. When member 133 undergoes a slight movement spring 211 promptly snaps latch 207 between teeth 209, and as this action occurs before the parts can attain momentum, no shock is set up thereby.

In view of the fact that power is transmitted through gears 152, 144, 145 and 164 in forward drive, and through gears 152, 144, and 172 in reverse drive, it is possible to vary the ratios of forward and reverse drive, and also the ratios with respect to each other, as desired, by properly designing the gears employed, although it is to be understood that the compound planet gear assembly may be used solely for forward drive, and an auxiliary reverse gear mechanism associated with the transmission to provide reverse drive, if desired, without departing from the spirit of my invention.

When it is desired to restore the parts to forward drive condition, shaft 203 is rocked into the position shown in Figure 1, thereby freeing member 133, locking member 187, and coupling member 159 and gear 164.

*Selective disconnection of the driving and driven shafts*

Although, as previously set forth, the prime mover is normally disconnected from the load when it is operating substantially at idling speeds, the transmission normally automatically establishes a driving connection between the driving and driven shafts when the prime mover is accelerated. If it is desired to prevent this automatic power transmitting operation from taking place, so that the prime mover may be operated at speeds which are substantially above idling speed, so as to allow it to "warm up", or for the purpose of facilitating adjustment of the carburetor thereof, if it is an engine of the internal combustion type, knob 231 is withdrawn into its intermediate or neutral position.

Actuation of knob 231 in this manner rocks shaft 203 into its intermediate position so as to bring clutch teeth 162 of member 159 out of engagement with clutch teeth 163 of gear 164, and the parts are so designed, that when shaft 203 is so oscillated, lever 205 is simultaneously actuated to cause latch plunger 196 to be withdrawn from latching engagement with member 187. When the parts are arranged in this condition, and the driving shaft is accelerated, the primary clutch couples shafts 3 and 9 as previously explained, and the resulting rotation of gear 152 produces counter-clockwise rotation, and also, to a less degree, clockwise planetation of the planet assemblies and clockwise rotation of gear 164, but as the latch is disconnected from member 159, no power is transmitted to shaft 154. As member 187 is free for counter-clockwise rotation, gear 172 may rotate counter-clockwise under the influence of the reaction of the planet assemblies, but as gear 164 is not connected to the load, the reaction forces are of small magnitude, and the resulting rotation is accordingly of low magnitude. Although member 133 may be rotated through planetation of the planet assemblies, the speeds involved in reverse drive are usually so low as to be insufficient to cause weights 56a to rock and engage the secondary clutch, but even if such engagement did occur, it would be ineffective to cause the transmission to deliver power because of the disconnected condition of member 159.

On the other hand, should it be desired to allow the engine to operate at speeds in excess of idling speed and be free of the gear mechanism, for instance in winter when the gear lubricants would congeal and exert considerable resistance to the normal idling action of the gears when the transmission is in neutral, knob 333 may be actuated so as to cause the intake manifold vacuum to completely disengage the primary clutch. Disengaging the primary clutch renders it incapable of establishing a drive between shafts 3 and 9 in response to acceleration of shaft 3, but as actuation of the accelerator bleeds atmospheric air into the right-hand end of cylinder 345, I preferably provide an independent throttle control (not shown), so that the engine may be accelerated without actuating valve 363.

In the event that the engine stalls when the vehicle is in motion, springs 45 automatically engage the primary clutch and thereby couple shafts 3 and 9, because atmospheric pressure exists in the intake manifold. If the secondary clutch is engaged when the primary clutch is engaged in this manner, a direct drive is established between the driving and driven shafts and the momentum of the vehicle may be employed to turn the engine over for cranking purposes.

In the event that the secondary clutch is disengaged and the vehicle is proceeding at a fairly low speed when the primary clutch engages in the manner just described, shaft 154 and gear 164 overrun and accelerates member 4a in the manner previously set forth, with the result that if the acceleration of member 4a is sufficient to cause weights 56a to rock outwardly, the secondary clutch will engage and couple shafts 9 and 154. In the event that the acceleration imparted to member 4a is not sufficient to engage the secondary clutch lever 274 may be rocked to dispose detent 281 in notch 277 and thereby establish a two-way, torque multiplying drive between shafts 9 and 154, or it may be rocked in the opposite direction to dispose detent in notch 279, to thereby allow springs 45a to bring the secondary clutch plates into engagement and establish a direct drive between shafts 9 and 154. Slot 286 in lever 267 allows this latter operation to be effected without interference from the brake.

In any event, as soon as the engine turns over, a vacuum is established in the intake manifold and the parts are pulled into automatic position, with the result that if the engine starts and is operated at idling speed after employing the momentum of the vehicle to crank it, shafts 3 and 9 are automatically disconnected. The vehicle may also be pushed or towed for the purpose of cranking the engine in this manner, and if it does not respond to such cranking, the primary clutch will alternately disengage and engage as the vacuum is alternately established and broken in the intake manifold, and if it is desired to avoid this operating feature, the accelerator may be depressed sufficiently so as to cause valve 363 to bleed the left hand side of cylinder 345 to the atmosphere and cut off communication with the intake manifold.

If it is desired to free wheel while operating in geared or direct drive, knob 333 is pulled into its outer position, thereby unlocking link members 315 and 317. With the primary clutch latch disposed in this condition, and with the transmission operating in direct drive, release of the accelerator causes the cylinder assembly to completely disengage the primary clutch, with the result that the engine may drop to idling speed, and so long as the vehicle momentum maintains the speed of member 4a above the operating speed of weights 56a, the secondary clutch remains engaged and compels shafts 9 and 154 to rotate synchronously. If the accelerator is depressed when the transmission is free wheeling in this manner, atmospheric air is bled into the cylinder and the weights operate to bring the plates into engagement in the manner previously described, and accordingly re-establish a direct drive between the load and engine. The geared speed free wheeling operation is similarly effected, except for the fact that brake 241 maintains a two way geared connection between shafts 9 and 154 at all times.

By reason of the smooth operating characteristics of the primary automatic clutch mechanism, and its ability to smoothly transmit torque efficiently under slipping drive conditions, if called upon, it could in fact be employed to directly couple shafts 3 and 154, and it would stand up under these conditions in view of the special facings employed therein and its durable nature. Therefore, the ratio of the gearing interposed between shafts 9 and 154 may have a fairly low value of torque multiplication and yet permit the vehicle to be started on steep grades with perfect ease. This is particularly a desirable characteristic for the reason that when the vehicle is being accelerated through the intermediary of the gears, the relative speeds of shafts 9 and 154 is not excessive, and when shaft 154 reaches sufficient speed, and the secondary clutch operates, it is not called upon to bring two shafts into synchronism that are rotating at widely variant speeds, and it therefore can smoothly and efficiently perform the functions required.

While the mechanisms shown provide only a single gear reduction, which is entirely satisfactory in a light vehicle of the pleasure car class, it is to be understood that in heavy duty vehicles such as trucks, busses, rail cars and the like, two or more of the transmission units disclosed may be disposed in series behind a single primary clutch to give two or more gear reductions, and in such case the weights of the first secondary clutch mechanism would be so designed as to operate considerably before the centrifugal weights of the second secondary automatic clutch mechanism came into play, so that a direct drive would be established between the shaft coupled by the first secondary automatic clutch mechanism while torque is transmitted between the shaft coupled by the secondary clutch mechanism through the second gear reduction. If desired one or more of the gear mechanisms utilized may be of the character shown in co-pending application, Serial No. 643,744, filed November 21, 1932, but the high speed assembly is preferably of the type shown in the present case so that the accelerator may be released to selectively shift the transmission into direct drive when sufficient speed has been attained. In such a power transmitting mechanism final direct drive conditions are reached when the primary automatic clutch mechanism and all of the secondary automatic clutch mechanisms are fully engaged and a direct drive is established from the engine to the rear wheels of the vehicle.

With particular reference to the term "direct drive", I wish it to be understood that this term, as employed in the specification and claims of the present case is intended to be interpreted as relating to the immediate parts of the transmission which are "directly connected" by the novel torque multiplying and ratio changing mechanism, which, in the present instance are members 9 and 154. For instance, the present mechanism is designed for use in a motor vehicle, and as the gears utilized in the rear axles of such vehicles usually involve a gear reduction, it is obvious that when the transmission is operating in "direct drive' it does not directly connect the engine and the vehicle wheels. Moreover, an auxiliary gear reduction may be employed in front of or behind the present transmission, and the appended claims are intended to embrace my mechanism when it is used in this relation.

While I have disclosed and prefer to employ centrifugally operable mechanism for causing engagement of the primary and secondary automatic clutches, it is to be understood that any suitable speed-responsive mechanism for bringing relatively rotating shafts into synchronism may be substituted for the primary and secondary clutches here disclosed and an operable mechanism obtained.

In a vehicle provided with power transmitting mechanism of the character that I have disclosed, if it is desired to start the vehicle on a grade, the engine is accelerated and the primary automatic clutch mechanism operates to establish a slipping torque transmitting coupling between the prime mover and the intermediate shaft, as previously explained, and the vacuum cylinder assembly is preferably designed so as to render the clutch solely speed-responsive, in view of the fact that the facings employed stand up under such use. If desired however, the optional bleeding organization disclosed for bleeding atmospheric air into the cylinder for thereby introducing a power responsive phase into the operation of the primary clutch may be used if it is desired to reduce the slip period thereof, or if the facings utilized will not stand excessive slippage. Rotation of the intermediate shaft, through the medium of the interposed gearing, causes an amplified torque to be transmitted to the driven shaft. Through the slipping drive coupling existing between the prime mover and the load, the prime mover is allowed to accelerate and operate efficiently on a relatively high point on its speed-torque curve to develop adequate power to start the vehicle, even though the interposed gear mechanism may have only a low torque value of amplification. During this operation, the secondary automatic clutch mechanism is inactive since it relies for its actuation upon the speed of the load, and the only connection existing between the prime mover and its load is that established by the interposed gearing, which supplies sufficient torque amplification to enable the engine to effectively handle the load under these conditions.

By way of a concrete example, assuming that the novel transmission mechanism herein disclosed is incorporated in a motor vehicle, and the transmission gearing has a reduction of two to one, the primary clutch mechanism initiates operation at an engine speed of five hundred revolutions per minute, completing its operation at an engine speed of one thousand revolutions per minute, a non-slipping drive with torque amplification is thereby established between the engine and the rear wheels when the engine is operating substantially at one thousand revolutions per minute. With normal rear axle gear ratios, this results in a vehicle speed of ten miles per hour, although it is to be understood that completion of primary clutch operation may take place at a higher or lower vehicle speed, depending upon whether the vehicle is ascending or descending a grade or is proceeding on a level surface.

Under these conditions the secondary clutch mechanism, due to the fact that it is actuated in accordance with the speed of the driven shaft and vehicle wheels coupled thereto, may be designed to operate to directly couple the engine and rear wheels at any desired vehicle speed, for instance fifteen miles per hour, and such operation is therefore entirely independent of speed fluctuations of the engine.

In Figure 9 I have illustrated the mechanism just described with certain parts modified to provide a further forward drive gear ratio, also forming part of my invention.

In this form of the invention planet carrier 133a is of slightly shorter axial length and secured thereto, by means of cap screws 391, is a jaw clutch member 392 having clutch teeth 393 preferably integrally formed therein. Cap screws 391 are located intermediate planet shafts 147 as shown, and although I prefer to construct the device with members 133a as separate elements, they may be integrally formed if desired.

Clutch teeth 162 of sliding clutch member 159 are adapted to be selectively engaged with clutch teeth 393 of jaw clutch member 392, so as to connect the planet carrier with shaft 154, and to this end, shaft 203 and knob 231, and the intermediate controlling mechanism, are adapted to assume five major operative positions. With knob 231 disposed in the position shown in Figure 6, member 159 assumes the position shown in Figure 9, with its teeth engaged with clutch teeth 163 of gear 164. Member 159 may be moved to the right into a neutral position, between members 164 and 392, into engagement with member 392, into a neutral position between member 392 and teeth 223 of member 172, and into engagement with teeth 223. The parts are so designed that latch member 196 will lock member 187 against rotation when clutch member 159 is engaged with gear 164 or jaw clutch member 392, and to this end notches 221a formed in lever 205 are of sufficient depth to allow shaft 203 to shift the clutch member from engagement with gear 164 into engagement with member 392 without lifting latch member 196 out of the particular recess 195 of member 187 with which it is engaged, with the result that member 172 is locked against retrograde rotation when clutch member 159 is in these two positions.

With the parts disposed as shown in Figure 9, movement of shaft 203 so as to shift member 159 to the right, into its first neutral position serves to take up approximately one-half of the clearance existing between pin 217 and notches 221a. Further movement of shaft 203 so as to bring member 159 into engagement with member 392 brings notches 221a just into engagement with pin 217, and member 196 accordingly remains engaged with member 187. Movement of shaft 203 so as to bring member 159 into its second neutral position, or into engagement with clutch teeth 223, causes lever 205 to pick up pin 217 and withdraw member 196 from engagement with notches 195 formed in member 187, and thereby releases member 172.

With member 159 engaged with gear 164 or clutch teeth 223, the transmission is adapted to operate in the manner described in connection with the first form of my invention.

When member 159 is engaged with member 392, and with lever 274 disposed in the position shown in Figure 7, the primary and secondary clutches are disengaged when shaft 3 is operating at idling speed. When the engine is eccelerated the primary clutch engages in the manner previously described and couples shafts 3 and 9. Rotation of shaft 9 causes gears 145 and 146 to planetate within gear 172 and produce rotation of planet carrier 133a. In view of the fact that gear 164 is disconnected from shaft 154 it merely idles and power is transmitted through carrier 133a, and members 392 and 159 to shaft 154. Shaft 154 is accordingly driven synchronously with carrier 133a, and as the speed of the carrier is less than that of gear 164, the torque multiplication under these conditions is greater than that existing when member 159 is coupled to gear 164. With the transmission operating as just described, the secondary clutch engages when the carrier attains a predetermined speed and thereby directly couples shafts 9 and 154.

It should be observed that when the transmission is operating through the geared speed range, with member 159 coupled to the planet carrier, release of the accelerator does not produce selective automatic engagement of the secondary clutch, as described in connection with the first form of my invention, because the planet carrier, to which the secondary clutch responds, is directly connected to shaft 154, and it accordingly does not undergo acceleration when a reversal of drive occurs. Member 159 may accordingly be shifted into engagement with member 392 when it is desired to eliminate this operating characteristic of the transmission. When the accelerator has been released, as just described, shaft 154 tends to drive the planet carrier, and as the engine tends to drop to idling speed, gear 152 resists the driving efforts applied to it by gear 144, with the result that gear 172 overruns. As soon as gear 172 overruns, shafts 9 and 3 drop to idling speed and the primary clutch disengages, thereby completely disconnecting the engine from the transmission.

Member 159 may be shifted into engagement with member 392, and lever 274 rocked to bring detent 281 into recess 277 so as to provide a permanent torque multiplying drive when the vehicle is ascending long mountain grades that are too steep for the engine to handle, with clutch member 159 being driven by gear 164. Member 159 may be shifted in this manner at other times, with or without rocking lever 274, when for any reason a comparatively great torque multiplication is needed.

Although I have illustrated a particular form of mechanism for transmitting power from the planet carrier to shaft 154, it is to be understood that any other suitable means may be employed for achieving this result without departing from the spirit of my invention, for instance, individual sets of teeth or like means may be provided on member 159 for cooperation with members 133a, 164 and 172, may be satisfactorily employed. Moreover, I have provided a device having two neutral positions in order to facilitate shifting member 159, but it is to be understood that one or both neutral positions may be eliminated, if desired, without in any way impairing the essential characteristics of the invention.

With particular reference to the term "speed", employed in the specification and claims, in connection with the operation of the primary and secondary clutches, it is to be understood that this term does not limit the clutches to the speed response type, but it is designed to embrace clutches of the type wherein only a portion of their operation is speed-responsive.

I have illustrated a particular gear organization for effecting an automatic transition in the drive when the accelerator is released with the parts operating in a predetermined speed range, so that if conditions are such that it is desirable to apply substantial torque to the load over a wide load accelerating range, the accelerator may be continuously applied to maintain the transmission in gear and thereby secure torque multiplication over the entire range, without a break in the delivery of power, or, if desired, the accelerator may be momentarily released to shift the parts into direct drive. The mechanism I have illustrated effectively produces this result, and constitutes the preferred embodiment of my invention, but it is to be understood that other gear and clutch organizations may be used without in any way departing from the spirit of my invention, and the appended claims are intended to embrace any gear and clutch organization wherein a reversal of driving forces is operable to effect an acceleration of the speed responsive part or parts of the mechanism which is utilized to establish a direct drive between the driving and driven members, or effects a shift up to the next higher gear.

Although I have described shafts 3 and 9 as driving shafts, it is to be understood that if desired, power may be applied to other parts of the mechanism, such as shaft 154, and be taken from shafts 3 or 9, and the appended claims are intended to embrace my mechanism when it is used in this manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a power transmission device, a driving member; a driven member; a torque multiplying mechanism associated with said driving and driven members and operable to transmit power therebetween and having a part which is adapted to rotate at a definite speed relatively to said driven member when the mechanism is transmitting power from the driving to the driven member; means operatively associated with said mechanism for automatically causing said part to rotate at a different speed relatively to said driven member when the latter tends to transmit power to the mechanism, and means for automatically establishing a one-to-one drive between said driving and driven members when said part is rotated at said different speed.

2. The device set forth in claim 1, wherein said torque multiplying mechanism part is adapted to be accelerated when the driven member tends to transmit power to the mechanism.

3. The device described in claim 1, together with means cooperating with said torque multiplying mechanism part for establishing a direct connection between said members when the speed of said torque multiplying mechanism part is modified by a reversal of driving efforts in said mechanism.

4. In an automatic power transmission device, a driving member; a driven member; a torque multiplying mechanism operably associated with said members and adapted to transmit power therebetween, an element associated with said torque multiplying mechanism and adapted to be rotated when the latter is transmitting power from the driving to the driven member; means comprising parts of said torque multiplying mechanism, for causing said element to accelerate when said driven member tends to transmit power to the torque multiplying mechanism; and means cooperating with said mechanism for establishing a direct drive between the driving and driven members when said element is so accelerated.

5. The device described in claim 4, wherein said last named means comprises a speed responsive device having parts thereof mounted for synchronous rotation with said element.

6. In a power delivery organization of the character wherein a prime mover is connected to an automatic transmission mechanism, a low speed clutch for automatically initiating power transmission through said mechanism when said prime mover attains a predetermined speed; a second clutch for automatically establishing a direct drive through said transmission when certain speed conditions have been attained in the transmission mechanism; and means, operatively associated with said mechanism and adapted to be actuated in accordance with the power supplied to said transmission, for introducing a power responsive phase into the operation of at least one of said clutches, by modifying the normal automatic operation thereof.

7. In a power transmitting mechanism, driving and driven members; a torque multiplying mechanism normally connecting said members; means for establishing a direct drive between said members when one of them attains a predetermined speed, said means being normally operable to maintain the driving connection thus established even when said one member is decelerated to a speed substantially below said predetermined speed; and means for selectively causing said direct drive establishing means to automatically discontinue said direct drive when said one member is decelerated to speeds only slightly below said predetermined speed.

8. In a power transmitting mechanism, a driving member; a driven member; a torque multiplying mechanism normally interconnecting said members and having rotatable parts; means operably associated with said mechanism for automatically establishing a direct drive between said members when one of said parts attains a predetermined speed; and means associated with said torque multiplying mechanism for selectively rendering said means responsive to the speed of another of said rotatable parts.

9. The power transmitting mechanism described in claim 8, wherein said first named means is adapted to establish a direct drive between said members at speeds below said predetermined speed when it is responsive to said first named rotatable part.

10. The power transmitting mechanism described in claim 8, wherein said first named part is responsive to torquing forces in said torque multiplying mechanism and is automatically operable to cause said first-named means to establish a direct drive between said members.

11. In a power transmitting mechanism, a driving member and a driven member mounted for rotation and adapted to have power transmitted therebetween, torque multiplying means normally interconnecting said driving and driven members; controlling means, comprising a speed responsive friction clutch, associated with said torque multiplying means and operable to establish a direct drive between said driving and driven means when it is engaged, resilient means tending to engage said clutch, holding means normally maintaining said clutch disengaged to thereby render its operation speed responsive, said holding means being selectively operable to allow said resilient means to engage said clutch, to thereby maintain a direct drive between said driving and driven members irrespective of speed conditions in the mechanism.

12. The power transmitting mechanism described in claim 11, wherein said holding means is selectively operable to maintain said clutch disengaged at all times, to thereby maintain a torque multiplying connection between said driving and driven members.

13. In a power transmitting mechanism of the character wherein a prime mover is coupled to a load through a torque multiplying mechanism; means, comprising a speed responsive clutch, for automatically establishing a driving connection between said prime mover and load through said torque multiplying mechanism when said prime mover attains a predetermined speed, means for automatically establishing a direct drive between said prime mover and load when certain conditions have been attained in the mechanism, and means for automatically establishing a driving connection between said prime mover and load when said prime mover is stopped.

14. The power transmitting mechanism described in claim 13 wherein said last-named means comprises means for automatically engaging said clutch independently of its normal speed responsive action.

15. The power transmitting mechanism described in claim 13, wherein resilient means normally tends to engage said speed responsive clutch, and wherein said prime mover comprises an internal combustion engine having means connected to the intake manifold thereof for preventing said resilient means from engaging said clutch unless the engine is stopped.

16. In a power transmitting mechanism in sub-combination, a driving shaft, a driven shaft disposed in axial alignment with said driving shaft and mounted for rotation relatively thereto, said driving and driven shafts having driving and driven sun gears secured thereto respectively, a counter-shaft gear carrier mounted for rotation about the axes of said shafts; a large gear and a small gear mounted for synchronous rotation upon said carrier and meshing respectively with said driving and driven sun gears, one-way clutch means for preventing said large and small gears from undergoing bodily retrograde movement when power is transmitted thereby; and an automatic clutch, responsive to the speed of rotation of said carrier, for transmitting power from said driving shaft to said carrier to thereby establish a direct drive between said shafts.

17. The power transmitting mechanism described in claim 16, wherein said one-way clutch means comprises an internal gear mounted for rotation about the axes of said shafts and meshing with said large gear and having a one-way clutch connected thereto.

18. The power transmitting mechanism described in claim 16, wherein said large and small gears are operable to planetate and cause rotation of said carrier when power is being transmitted between said shafts through said gears.

19. In a power transmitting mechanism, a driving shaft and a driven shaft disposed in axially aligned relationship and mounted for relative rotation, said shafts each having a sun gear fixed thereto, a planet gear carrier mounted for rotation about the axes of said shafts and having planet gears rotatable thereon meshing with said sun gears, means comprising a one-way clutch, for causing said planet gears to planetate and transmit power to said driven shaft when power is applied to said driving shaft, and for causing said carrier to accelerate when power is transmitted from said driven shaft to said driving shaft; and an automatic clutch, responsive to the speed of said carrier, for automatically transmitting power from said driving shaft to said carrier, to thereby establish a direct drive between said driving and driven shafts.

20. The power transmitting mechanism described in claim 19, together with means for disconnecting the sun gear from said driven shaft and for connecting said carrier to said driven shaft, to thereby prevent said carrier from accelerating when power is transmitted from the driven shaft to the driving shaft.

21. In a power transmitting mechanism, in sub-combination, driving and driven shafts, mounted for relative rotation, a torque multiplying mechanism for transmitting power between said shafts, comprising a planet gear assembly and an internal gear, said internal gear defining a housing enclosing said planet gear assembly;

and means for preventing lubricant from leaking from said internal gear, thereby insuring lubrication of said planet gear assembly.

22. The power transmitting mechanism described in claim 21, wherein said planet gear assembly comprises a rotatably supported planet gear carrier, and wherein the means of claim 21 comprises closely interfitting portions of said internal gear and said planet gear carrier.

23. In a power transmitting mechanism driving and driven members interconnected by a torque multiplying mechanism comprising a planet carrier having planet gears thereon that mesh with driving and driven sun gears carried by said driving and driven members respectively; means for causing said planet gears to planetate when power is applied to said driving shaft comprising a one-way clutch having means for releasing it for two-directional operation, means for selectively coupling said driven shaft to said driven sun gear and said planet carrier, and common means for controlling said last-named means and said one-way clutch releasing means.

24. The power transmitting mechanism described in claim 23, wherein sufficient lost-motion is present in said controlling means to permit said driven shaft to be selectively coupled to said driven sun gear or said planet carrier without releasing said one-way clutch.

25. In a power transmitting mechanism, in sub-combination, a planetary gear assembly, a releasable back-stop for said assembly comprising a one-way clutch and a latch for permitting said clutch to allow two-directional operation of said planet assembly, and means for operating said latch having a yieldable connection therewith.

26. In a power transmitting mechanism, in sub-combination, a planetary gear assembly, a one-way clutch connected to said assembly, said clutch having a toothed rotatable member, a latch adapted to enter the teeth of said member and lock said planetary gear assembly against two-directional rotation, an actuating element having a lost-motion connection to said latch, and resilient means connected to said latch and said element and urging them into force transmitting relationship.

27. In a power transmitting mechanism, in sub-combination, a planet carrier mounted for rotation and having peripheral teeth, a latch member supported for rocking movement and adapted to enter the teeth of said carrier, said latch being mounted for rocking movement on a shaft and having resilient means urging it toward said planet carrier teeth, and means for holding said latch out of engagement with said planet carrier teeth when said shaft is disposed in a predetermined position, whereby said shaft may be fully rocked to bring said latch into engagement with said carrier teeth regardless of whether said latch aligns with said teeth.

28. In a power transmitting mechanism, a driving member and a driven member mounted for relative rotation, a torque multiplying mechanism including an orbital gear for transmitting power between said members, an automatic friction clutch for automatically establishing a direct drive between said members when certain conditions have been attained in the mechanism, and selectively operable means for maintaining said clutch disengaged and for applying a braking influence to said orbital gear, said means embodying a lost-motion connection.

29. The power transmitting mechanism described in claim 28, wherein said means comprises a brake mechanism having a resilient force transmitting element therein whereby said clutch may undergo controlling movements without producing corresponding actuation of said brake mechanism.

30. In a power transmitting mechanism, in sub-combination, a planetary gear system having a brake device associated with a part thereof; a brake actuating lever, and a compression link connecting said brake device and said actuating lever; said link comprising two telescoped parts having a stop means limiting separational movement thereof, and resilient means holding said link parts in engagement with said stop means under a predetermined pressure whereby, when said link is placed under load said parts will transmit forces as a unit until said predetermined pressure is exceeded.

31. In a power transmitting mechanism, in sub-combination, a driving shaft, a driven shaft disposed in axial alignment with said driving shaft and mounted for rotation relatively thereto, said driving and driven shafts having driving and driven sun gears secured thereto respectively, a counter shaft gear carrier mounted for rotation about the axes of said shafts; a large gear and a small gear mounted for synchronous rotation upon said carrier and meshing respectively with said driving and driven sun gears, one-way clutch means for preventing said large and small gears from undergoing bodily retrograde movement when power is transmitted thereby; and an automatic clutch responsive to the speed of rotation of said carrier for transmitting power to said carrier to thereby cause the latter to rotate synchronously with said driving and driven shafts and frictionally couple said gears and compel unitary rotation thereof for establishing a direct drive between said driving and driven shafts.

32. The power transmitting mechanism described in claim 31 wherein said automatic clutch comprises a centrifugally controlled clutch and is operable to transmit power from said driving shaft to said carrier when the latter attains a predetermined speed.

33. In a power transmitting mechanism, a driving shaft and a driven shaft disposed in axially aligned relationship and mounted for relative rotation, said shafts each having a sun gear fixed thereto, a gear carrier mounted for rotation about the axes of said shafts and having planet gears rotatable thereon and meshing with said sun gears, means comprising a one-way clutch for preventing retrograde rotation of said planet gear carrier and for compelling said planet gears to rotate and transmit power to said driven shaft when power is applied to said driving shaft and for causing said carrier to accelerate when power is transmitted from said driven shaft to said driving shaft; and a centrifugally operable clutch responsive to the speed of said carrier for automatically transmitting power between one of said shafts and said carrier to thereby establish a direct drive between said driving and driven shafts.

34. In a power transmitting mechanism, a driving member having a driving sun gear thereon; a driven member having a driven sun gear thereon; a gear carrier rotatable about the axis of said driving and driven members and rotatably supporting planet gears meshing with said driving and driven sun gears; a rotatably supported orbital gear meshing with certain of said planet gears, means for locking said orbital gear against rotation in one direction, said carrier and gears being operable to transmit power with a torque multiplication from said driving member to said driven member; and means for automatically establishing a direct drive between said driving and driven members when said driven member is accelerated to a predetermined speed, said means being operable in response to torquing forces in the mechanism to automatically establish a direct drive between said driving and driven members when said driven member is rotated at speeds below said predetermined speed.

35. The power transmitting mechanism described in claim 34 wherein said last-named means is responsive to the speed of said gear carrier.

36. The power transmitting mechanism described in claim 34 wherein said last-named means is operable to maintain said direct drive between said driving and driven members even when said driven member is decelerated to speeds considerably lower than said predetermined speed.

37. In a power transmitting mechanism, a driving member and a driven member, a planetary gear mechanism interconnecting said members and operable to transmit power from said driving member to said driven member at a predetermined speed reduction ratio, said mechanism embodying a part which rotates at a predetermined speed with respect to said driven member when power is transmitted from said driving member to said driven member, means for establishing an independent drive between said members when said part is accelerated to a predetermined speed, said mechanism and means also being operable, in response to a reversal of driving efforts between said driving and driven members to establish said independent drive when said part is accelerated to a speed which is considerably less than said predetermined speed.

38. The power transmitting mechanism described in claim 37 wherein said means comprises a speed responsive clutch carried by and responsive to the speed of said part for frictionally connecting the gears together for unitary rotation.

39. The power transmitting mechanism described in claim 37 wherein said part comprises a planet gear carrier and said means comprises a speed responsive clutch for connecting said carrier to one of said members.

40. The power transmitting mechanism described in claim 37 wherein said planetary gear mechanism also comprises driving and driven sun gears carried by said driving and driven members respectively; a pair of planet gears rotatably supported in said part and meshing with said sun gears; and an orbital gear mounted for rotation about the axis of said members and meshing with one of said planet gears.

41. In a power transmitting mechanism, a driving member and a driven member mounted for rotation and adapted to have power applied thereto and taken therefrom respectively, a torque multiplying mechanism operably connected to said members for transmitting power therebetween, said mechanism being operable, when shifted down, to transmit multiplied torque from said driving member to said driven member, and to establish a direct drive between said members when it is shifted up, means for causing said mechanism to automatically shift up when said driven member is accelerated to a predetermined speed, said means also being responsive to a reversal of driving relations in said mechanism, to cause said mechanism to automatically shift up when said driven member is rotated at speeds lower than said predetermined speed.

42. The power transmitting mechanism described in claim 41 wherein said means is operable to maintain said mechanism in shifted up condition even when said driven member is decelerated to speeds considerably below said predetermined speed.

43. The power transmitting mechanism described in claim 41 wherein said torque multiplying mechanism comprises a part which is operable to rotate at a definite speed with respect to said driven member when said mechanism is operating in shifted down condition, and wherein said means comprises a centrifugally operable friction clutch which is responsive to variations in the speed of said part for frictionally connecting the latter to one of said members.

JOSEPH EDWARD PADGETT.